(12) United States Patent
Tatro

(10) Patent No.: US 11,203,279 B1
(45) Date of Patent: Dec. 21, 2021

(54) COLLAPSIBLE SHELTER SYSTEM

(71) Applicant: Redtail Overland LLC, Longmont, CO (US)

(72) Inventor: Tyler Wells Tatro, Longmont, CO (US)

(73) Assignee: Redtail Overland LLC, Longmont, CO (US)

( * ) Notice: Subject to any disclaimer, the term of this patent is extended or adjusted under 35 U.S.C. 154(b) by 0 days.

(21) Appl. No.: 17/485,063

(22) Filed: Sep. 24, 2021

Related U.S. Application Data

(63) Continuation of application No. 17/321,259, filed on May 14, 2021, now Pat. No. 11,130,437.

(51) Int. Cl.
| | | |
|---|---|---|
| *B60R 9/04* | (2006.01) | |
| *B60P 3/39* | (2006.01) | |
| *E04H 15/06* | (2006.01) | |
| *E04H 15/32* | (2006.01) | |
| *E04H 15/58* | (2006.01) | |
| *E04H 15/48* | (2006.01) | |

(52) U.S. Cl.
CPC ............ *B60P 3/39* (2013.01); *B60R 9/04* (2013.01); *E04H 15/06* (2013.01); *E04H 15/324* (2013.01); *E04H 15/48* (2013.01); *E04H 15/58* (2013.01)

(58) Field of Classification Search
CPC ....... E04H 15/06; E04H 15/324; E04H 15/48; E04H 15/58; E04H 15/39; B60R 9/04; B60R 9/045; B60R 9/048; B60R 9/055; B60R 9/058; F16B 2/14; B60P 3/39
See application file for complete search history.

(56) References Cited

U.S. PATENT DOCUMENTS

| | | | |
|---|---|---|---|
| 2,225,993 | A | 12/1940 | Hornberger |
| 2,483,332 | A | 9/1949 | Brumbaugh |
| 2,561,168 | A | 7/1951 | Beckley |
| 2,729,497 | A | 1/1956 | Runyan |
| 2,811,725 | A | 11/1957 | Cence |

(Continued)

FOREIGN PATENT DOCUMENTS

DE 19533157 A1 * 3/1996 ............... B60R 9/04

OTHER PUBLICATIONS

"Hiatus Camper" URL: https://www.hiatuscampers.com/; retrieved on May 13, 2021, 7 pages.

(Continued)

*Primary Examiner* — Gregory A Blankenship
(74) *Attorney, Agent, or Firm* — Stephen B. Katsaros; Patent Engineering, LLC

(57) ABSTRACT

In an embodiment, a collapsible shelter system is provided that includes a base defining a front edge and a back edge and a roof defining a front edge and a back edge. A front height is defined by the distance between the front edge of the base and the front edge of the roof, and a back height is defined by the distance between the back edge of the base and the back edge of the roof. The system further includes a first side wall and a second wall, each including a lower portion hingedly attached to the base and an upper portion hingedly attached to the roof, and the lower portion hingedly attached to the upper portion along a middle-hinge axis. The collapsible shelter system is configurable between a closed position and an open position. In the open position, the back height is greater than the front height.

24 Claims, 26 Drawing Sheets

(56) References Cited

U.S. PATENT DOCUMENTS

| | | | | |
|---|---|---|---|---|
| 2,917,059 | A | 12/1959 | Emanuelson | |
| 3,018,782 | A | 1/1962 | Hershberger | |
| 3,053,562 | A | 9/1962 | Farber | |
| 3,061,359 | A | 10/1962 | Pearlman | |
| 3,190,689 | A | 6/1965 | Calthorpe | |
| 3,202,457 | A | 8/1965 | Wiley | |
| 3,212,812 | A | 10/1965 | Kurtz | |
| 3,212,813 | A | 10/1965 | Peterson et al. | |
| 3,255,466 | A | 6/1966 | Weizer | |
| 3,324,610 | A | 6/1967 | Adams | |
| 3,377,100 | A | 4/1968 | Cripe | |
| 3,466,083 | A | 9/1969 | Owen | |
| 3,575,460 | A | 4/1971 | Kennedy | |
| 3,685,061 | A * | 8/1972 | Wray | B60P 3/1025 5/119 |
| 3,713,687 | A | 1/1973 | Hooks et al. | |
| 3,765,716 | A | 10/1973 | Van Gompel | |
| 3,785,693 | A | 1/1974 | Fulton et al. | |
| 3,953,066 | A | 4/1976 | Hamilton | |
| 4,223,689 | A | 9/1980 | Cox | |
| 4,262,956 | A | 4/1981 | Kellam | |
| 5,213,390 | A | 5/1993 | Borchers | |
| 5,544,671 | A | 8/1996 | Phillips | |
| 5,657,914 | A * | 8/1997 | Stapleton | B60R 9/045 224/309 |
| 5,951,095 | A | 9/1999 | Herndon | |
| 6,394,531 | B2 | 5/2002 | Thompson et al. | |
| 6,712,421 | B1 | 3/2004 | Wilson | |
| 7,025,406 | B2 | 4/2006 | Capp | |
| 7,090,286 | B1 | 8/2006 | Foreth et al. | |
| 7,357,440 | B1 | 4/2008 | Calandruccio | |
| 7,527,318 | B2 | 5/2009 | Geise | |
| 7,699,372 | B2 | 4/2010 | Adams et al. | |
| 7,845,699 | B2 | 12/2010 | Leopold | |
| 8,123,270 | B2 | 2/2012 | Baccelli | |
| 8,807,407 | B2 * | 8/2014 | Hubbard | B60R 9/045 224/321 |
| 9,731,659 | B2 * | 8/2017 | Goldberg | B60R 9/055 |
| 10,077,574 | B1 | 9/2018 | Currid | |
| 10,086,684 | B1 | 10/2018 | Stamm, Jr. | |
| 10,414,322 | B1 | 9/2019 | Coulter | |
| 10,569,624 | B2 | 2/2020 | Sviberg | |
| 10,590,675 | B2 | 3/2020 | Zhou et al. | |
| 10,829,028 | B2 | 11/2020 | Delgadillo | |
| 10,985,689 | B2 | 4/2021 | Wickramasekera | |
| 11,130,437 | B1 * | 9/2021 | Tatro | E04H 15/324 |
| 2002/0135204 | A1 | 9/2002 | Okamoto | |
| 2008/0061198 | A1 * | 3/2008 | Noyes | B60R 9/10 248/205.1 |
| 2008/0308138 | A1 | 12/2008 | Brochier et al. | |
| 2010/0186309 | A1 | 7/2010 | Hawkins | |
| 2012/0241486 | A1 * | 9/2012 | Shen | B60R 9/045 224/321 |
| 2016/0362063 | A1 * | 12/2016 | McFadden | B60R 9/05 |
| 2017/0028930 | A1 * | 2/2017 | Connors | B60R 9/045 |
| 2020/0148089 | A1 | 5/2020 | Thompson | |
| 2020/0377029 | A1 * | 12/2020 | Yoon | F16B 35/06 |
| 2020/0377033 | A1 * | 12/2020 | Andersson | B60R 9/058 |

OTHER PUBLICATIONS

Ruggiero, Adam, "DIY Dream: Build This Amazing Custom Camper", URL: https://gearjunkie.com/motors/custom-pop-up-camper-bulld; retrieved May 13, 2021, published Mar. 20, 2018, 77 pages.

* cited by examiner

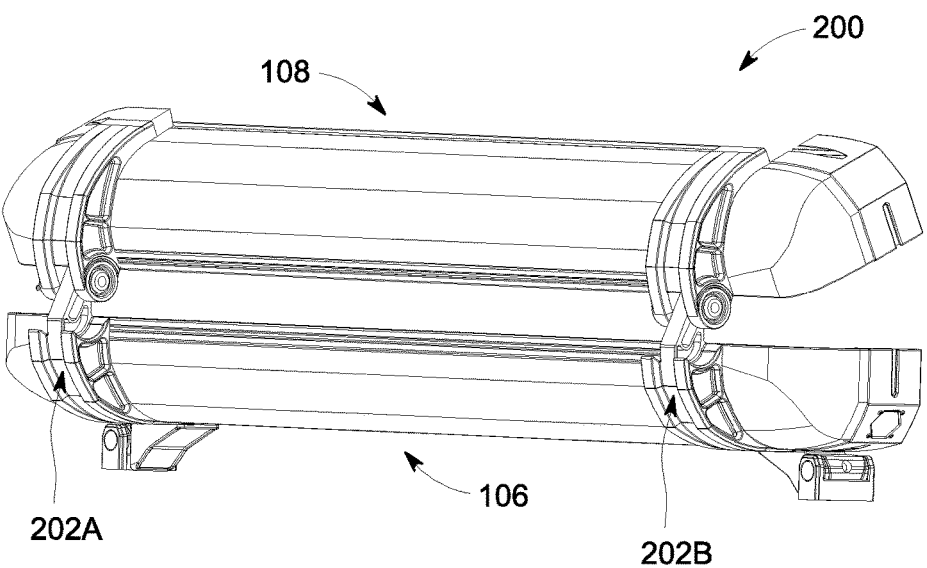
FIG. 3
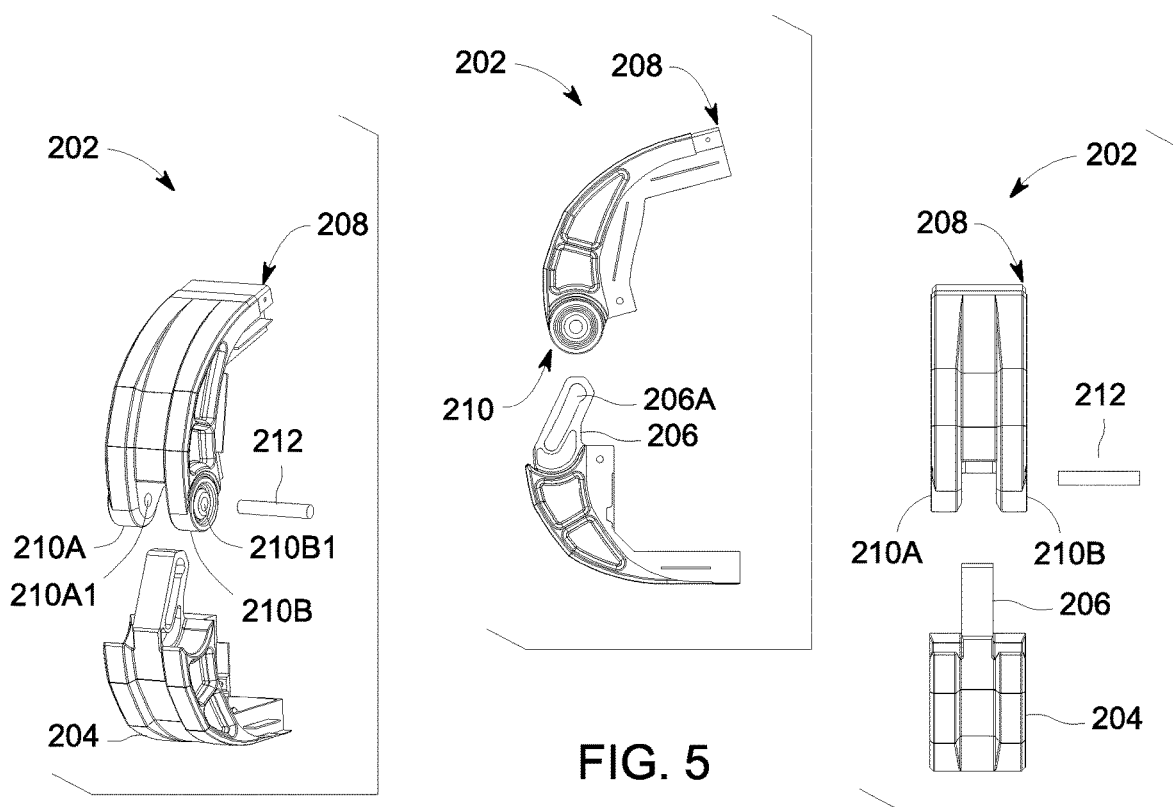
FIG. 4
FIG. 5
FIG. 6

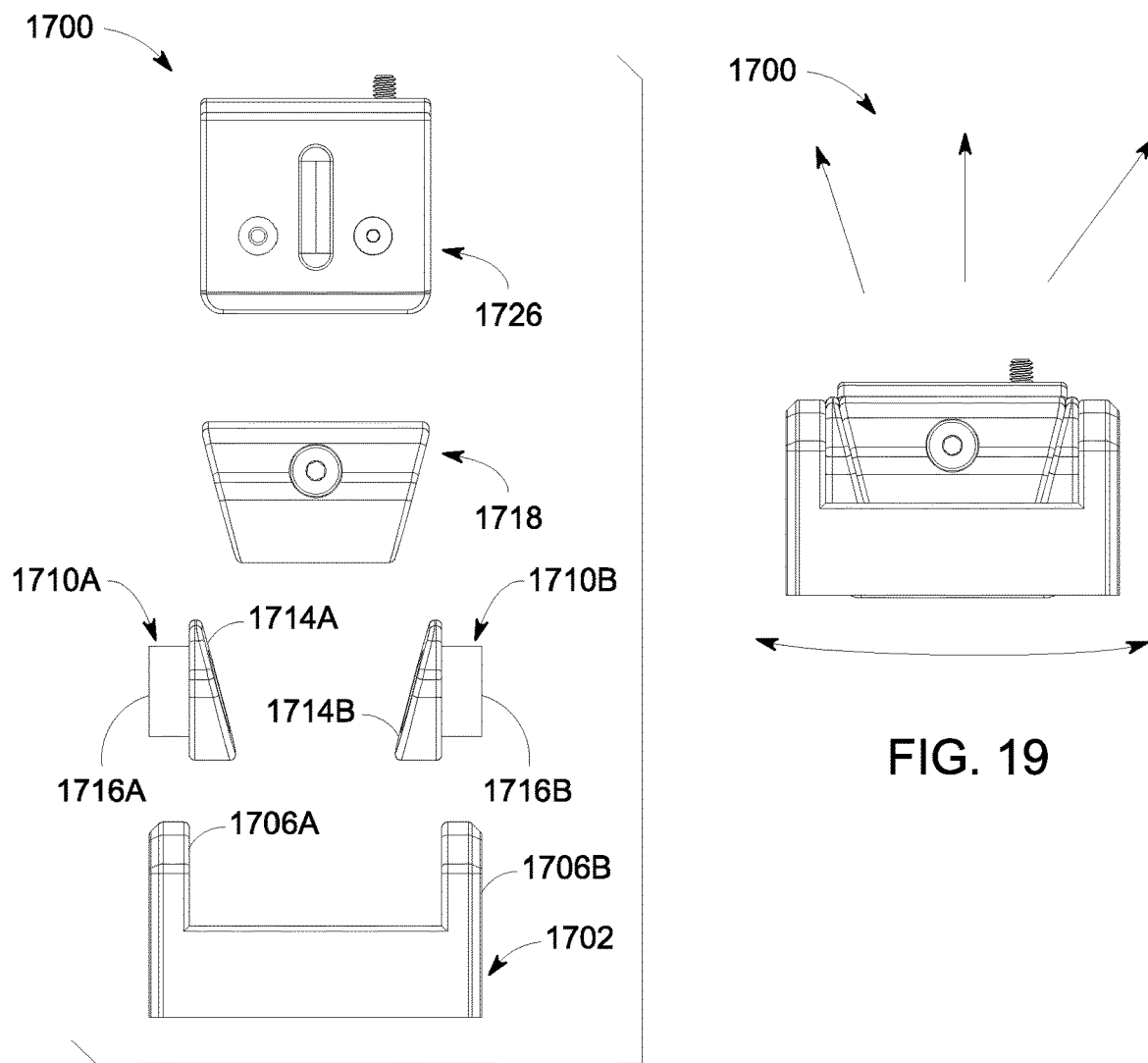
FIG. 18
FIG. 19
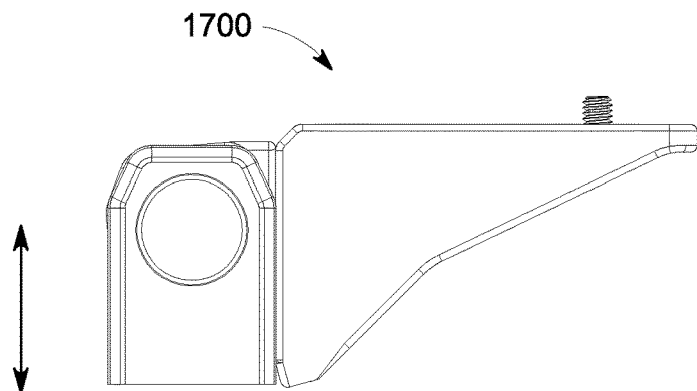
FIG. 20

```
┌─────────────────────────────────────────────────────────────┐
│ Providing a base and a roof, each defined by a front edge,  │
│ a back edge, a first side edge, and a second side edge 4402 │
└─────────────────────────────────────────────────────────────┘
                              │
                              ▼
┌─────────────────────────────────────────────────────────────┐
│ Providing a first side wall and a second side wall, each    │
│ defined by an inside surface and an outside surface         │
│ oppositely disposed from the inside surface, and each       │
│ comprising a lower portion and an upper portion 4404        │
└─────────────────────────────────────────────────────────────┘
                              │
                              ▼
┌─────────────────────────────────────────────────────────────┐
│ Hingedly attaching the roof to the base along the front     │
│ edge using one or more translating hinge assemblies;        │
│ wherein the one or more translating hinge assemblies        │
│ provides for translational movement and forrotational       │
│ movement of the roof with respect to the base 4406          │
└─────────────────────────────────────────────────────────────┘
                              │
                              ▼
┌─────────────────────────────────────────────────────────────┐
│ Hingedly attaching the lower portions of the first side     │
│ wall and the second side wall to the base along the first   │
│ side edge and the second side edge, respectively 4408       │
└─────────────────────────────────────────────────────────────┘
                              │
                              ▼
┌─────────────────────────────────────────────────────────────┐
│ Hingedly attaching the upper portions of the first side     │
│ wall and the second side wall to the roof along the first   │
│ side edge and the second side edge, respectively 4410       │
└─────────────────────────────────────────────────────────────┘
                              │
                              ▼
┌─────────────────────────────────────────────────────────────┐
│ Hingedly attaching the lower portions of the first side     │
│ wall and the second side wall to respective upper portions  │
│ of the first side wall and the second side wall along a     │
│ middle-hinge axis 4412                                      │
└─────────────────────────────────────────────────────────────┘
```

FIG. 44

```
┌─────────────────────────────────────────────────────────────┐
│ Securing a plurality of adjustable mounts to the rooftop of │
│ the vehicle 4502                                            │
└─────────────────────────────────────────────────────────────┘
                              │
                              ▼
┌─────────────────────────────────────────────────────────────┐
│ Adjusting the plurality of adjustable mounts to create a    │
│ plane nominally parallel to the rooftop of the vehicle and  │
│ independent of a contour of the rooftop of the vehicle 4504 │
└─────────────────────────────────────────────────────────────┘
                              │
                              ▼
┌─────────────────────────────────────────────────────────────┐
│ Securing the collapsible shelter system onto the plurality  │
│ of adjustable mounts 4506                                   │
└─────────────────────────────────────────────────────────────┘
```

FIG. 45

```
┌─────────────────────────────────────────────────────────────┐
│ Providing a frame defining a perimeter, the frame           │
│ comprising a first planar surface and a second planar       │
│ surface that is parallel to and offset from the first       │
│ planar surface 4602                                         │
└─────────────────────────────────────────────────────────────┘
                              │
                              ▼
┌─────────────────────────────────────────────────────────────┐
│ Providing a sheet defining a perimeter; wherein the         │
│ perimeter of the sheet coordinates with the perimeter of    │
│ the frame 4604                                              │
└─────────────────────────────────────────────────────────────┘
                              │
                              ▼
┌─────────────────────────────────────────────────────────────┐
│ Contacting the sheet to the first planar surface of the     │
│ frame 4606                                                  │
└─────────────────────────────────────────────────────────────┘
                              │
                              ▼
┌─────────────────────────────────────────────────────────────┐
│ Tensioning the sheet along the perimeter of the sheet 4608  │
└─────────────────────────────────────────────────────────────┘
                              │
                              ▼
┌─────────────────────────────────────────────────────────────┐
│ Attaching, after the tensioning, the sheet to the frame 4610│
└─────────────────────────────────────────────────────────────┘
```

COLLAPSIBLE SHELTER SYSTEM

TECHNICAL FIELD

This disclosure relates generally to a collapsible shelter system, and particularly to a collapsible shelter system for mounting on a vehicle and a method thereof.

CROSS REFERENCE TO RELATED APPLICATION

The present application claims priority to (i.e., is a non-provisional of) U.S. patent application Ser. No. 17/321,259 entitled "COLLAPSIBLE SHELTER SYSTEM" and filed 14 May 2021 by Tyler Wells Tatro (also referred to as U.S. Pat. No. 11,130,437 issued on 28 Sep. 2021). The entirety of the aforementioned application is incorporated herein by reference for all purposes.

BACKGROUND

Collapsible shelters (e.g., on vehicles) have existed for a century. In the case of attaching a shelter to a vehicle, mankind has always found comfort and convenience in having a shelter that is ready-to-use. While many configurations have been created and sold over the years, each one has limitations.

For example, existing collapsible shelters are rooftop tent assemblies with a collapsible frame. Rooftop tent assemblies are lightweight. However, rooftop tent assemblies typically have flimsy construction having canvas walls and roof. Such rooftop tent assemblies are not durable or comfortable, and they do not provide a sense of security against weather (e.g., high wind, heat, cold) or wild animals (e.g., leopard). Further, such rooftop tent assemblies lack basic comforts such as fan, light, power sockets, etc.

Further, for example, existing collapsible shelters with rigid walls boast insulation and basic comfort, but are heavy, non-removable, and poorly designed. In some case, they are cumbersome and strenuous to deploy, thereby requiring substantial skills, physical labor, or extra pair of hands. Additionally, in some case, they are not aerodynamically designed to deflect wind, specifically high wind, snow, or water from rain or melting snow. Further, in some case, they are not stable enough (i.e., they raise center of gravity when deployed) to avoid toppling during high wind.

In short, the available collapsible shelters are limited in their utility for lack of durability, security, weather-proofing, comfort, simplicity and ease of deployment, and stability.

SUMMARY

A collapsible shelter system is disclosed. The collapsible shelter system may be readily deployed when required, and may be readily collapsed when not in use. Thus, the collapsible shelter system serves as a way to easily transport and deploy a housing space that can be on a rooftop of a vehicle, a rear of a vehicle, on a trailer, or on stationary ground.

In one illustrative configuration, the collapsible shelter system may include a rigid base, a rigid roof, two rigid but foldable side walls, and a rigid collapsible back wall, thereby forming a durable and secure enclosure. The roof is hingedly attached to the base along a front edge using one or more translating hinge assemblies, which provides for translational movement as well as rotational movement of the roof with respect to the base. The collapsible back wall is hingedly attached to the base along the back edge. The foldable side walls, the collapsible back wall, and translating hinge assemblies facilitate quick and easy transition between the open position and the collapsed position. In a collapsed position, the base and the roof are nominally parallel to each other and to roof of the vehicle or the ground. In an open position, the roof is inclined to the base, thereby providing for aerodynamic design and optimum utilization of space. The collapsible back wall is also attachable to the roof along the back edge in the open position.

In one illustrative configuration, the collapsible shelter system may further include an ingress guard running along an inside perimeter of the base, thereby ensuring that interior of the collapsible shelter system is water-proof. Additionally, the ingress guard defines a space to hold a mattress. The collapsible shelter system may further include solar panels integrated on an outer surface of the roof, and a rechargeable battery that is charged by electricity generated by the solar panels. The rechargeable battery provides power to run lights, fans, heater, power sockets, and so forth.

In one illustrative configuration, the collapsible shelter system may further include adjustable mounts that are configured for securing the base to the rooftop of the vehicle. In particular, the adjustable mounts ensure that the base is nominally parallel to the rooftop of the vehicle, independent of a contour of the rooftop of the vehicle. The collapsible shelter system may further include one or more gas struts connecting lower portions and upper portions of the foldable side walls. The gas struts facilitate ease of deployment of the collapsible shelter system.

In one illustrative configuration, the foldable side walls may include at least one of a door and a window that folds along a fold line of the foldable side walls. The door is movably attached substantially perpendicular to the fold line. Similarly, the window is fixed or is movably attached substantially perpendicular to the fold line. In an embodiment, the lower portion of the window is hingedly attached to the upper portion of the window along the fold line. The collapsible back wall comprises a set of two vertically slidable windows. The upper portion of the frame for the set of two vertically slidable windows is hingedly attached to roof along the back edge. The opening of the upper portion of the frame for the set of two vertically slidable windows is facilitated by one or more gas struts. The base comprises a passthrough operable to slide or operable using one or more hinges and at least one gas strut. In an embodiment, the passthrough aligns with a sunroof of the vehicle to allow seamless movement of occupant or item/things between the vehicle and the collapsible shelter system.

In one illustrative configuration, the base, roof, foldable side walls, and end wall are molded from carbon fiber reinforced polymer that is rugged and durable and yet light weight. The window is a dual pane impact resistant window and is molded from polycarbonate sheets. The walls and the window are insulated, airtight, and watertight, thereby protecting the occupant as well as ant item that is stored.

In one illustrative configuration, the collapsible shelter system may further include a base defining a front edge and a back edge and a roof defining a front edge and a back edge. A front height is defined by the distance between the front edge of the base and the front edge of the roof, and a back height defined by the distance between the back edge of the base and the back edge of the roof. The collapsible shelter system may further include a first side wall defining an inside surface and an outside surface oppositely disposed from the inside surface. The first side wall may include a lower portion hingedly attached to the base, and an upper portion hingedly attached to the roof. The lower portion may be hingedly attached to the upper portion along a middle-hinge axis. The collapsible shelter system may further include a second side wall defining an inside surface and an outside surface oppositely disposed from the inside surface. The second side wall may include a lower portion hingedly attached to the base, and an upper portion hingedly attached to the roof. The lower portion may be hingedly attached to the upper portion along a middle-hinge axis.

In one illustrative configuration, the collapsible shelter system may be configurable in a closed position. In the closed position, each of the first side wall and the second side wall is folded about the middle-hinge axis. The upper portions of the inside surface of the first side wall and the second side wall may be facing the roof. Further, the lower portions of the inside surface of the first side wall and the second side wall may be facing the base. Furthermore, the upper portions of the outside surface of the first side wall and the second side wall may be facing the respective lower portions of the outside surface of the first side wall and the second side wall. Moreover, the middle-hinge axis of the first side wall may align with the middle-hinge axis of the second side wall.

In one illustrative configuration, the collapsible shelter system may be further configurable an open position. In the open position, each of the first side wall and the second side wall may be perpendicular to the base and to the roof, the roof may be non-parallel to the base, the middle-hinge axis of the first side wall may be parallel to the middle-hinge axis of the second side wall, and the back height may be greater than the front height.

In one illustrative configuration, the collapsible shelter system may further include one or more translating hinge assemblies configured for attaching the base with the roof. Each of the one or more translating hinge assemblies may provide for translational movement and for rotational movement of the roof with respect to the base. Each of the one or more translating hinge assemblies may include a fixed part configured to be attached to the base, a guide path configured within the fixed part, a movable part configured to be attached to the roof, a catch portion configured within the moveable part, and a pin configured to couple the fixed part with the movable part by cooperating with the guide path and the catch portion. Upon coupling, the pin may provide for a vertical movement of the movable part relative to the fixed part corresponding to a translation of the pin within the guide path, and a simultaneous rotational movement of the movable part relative to the fixed part corresponding to the translation of the pin within the guide path.

In one illustrative configuration, the collapsible shelter system may further include a back wall defining an inside surface and an outside surface oppositely disposed from the inside surface. The back wall may be hingedly attached to the base along the back edge of the base. In the closed position, the inside surface of the back wall may be facing the base, and the outside surface of the back wall is facing the lower portions of the inside surface of the first side wall and the second side wall. In the open position, the back wall may be couplable to the roof along the back edge of the roof. The back may include at least one of: a door, or a set of two vertically slidable windows. Each of the set of two vertically slidable windows may be configured to lock near the roof. Upon locking, a window frame may be configured to move the set of two vertically slidable windows into an open position.

In one illustrative configuration, a method of assembling a collapsible shelter system is disclosed. The method may include providing a base and a roof, each defined by a front edge, a back edge, a first side edge, and a second side edge, and providing a first side wall and a second side wall, each defined by an inside surface and an outside surface oppositely disposed from the inside surface. Each of the first side wall and the second side wall may include a lower portion and an upper portion. The method may further include hingedly attaching the roof to the base along the front edge using one or more translating hinge assemblies. The one or more translating hinge assemblies may provide for translational movement and for rotational movement of the roof with respect to the base. The method may further include hingedly attaching the lower portions of the first side wall and the second side wall to the base along the first side edge and the second side edge, respectively. The method may further include hingedly attaching the upper portions of the first side wall and the second side wall to the roof along the first side edge and the second side edge, respectively. The method may further include hingedly attaching the lower portions of the first side wall and the second side wall to respective upper portions of the first side wall and the second side wall along a middle-hinge axis.

In one illustrative configuration, a method of installing a collapsible shelter system on a rooftop of a vehicle is disclosed. the method may include securing a plurality of adjustable mounts to the rooftop of the vehicle, adjusting the plurality of adjustable mounts to create a plane nominally parallel to the rooftop of the vehicle and independent of a contour of the rooftop of the vehicle, and securing a base of the collapsible shelter system onto the plurality of adjustable mounts.

In one illustrative configuration, a method of assembling a window is disclosed. The method may include providing a frame defining a perimeter, the frame that may include a first planar surface and a second planar surface that is parallel to and offset from the first planar surface. The method may further include providing a sheet defining a perimeter that may adjoin with the perimeter of the frame. The method may further include contacting the sheet to the first planar surface of the frame, tensioning the sheet along the perimeter of the sheet, and attaching, after the tensioning, the sheet to the frame. While optional, the method may further include match-drilling, after the tensioning and before the attaching, at least one of the sheet and the frame; and after the match-drilling, the attaching the sheet to the frame with a plurality of fasteners.

In one illustrative configuration, a collapsible shelter system is disclosed. The collapsible shelter is mounted to a vehicle that is supported by a plurality of wheels. The collapsible shelter system may include a base, and a roof hingedly attached to the base. The collapsible shelter system may further include a set of solar panels integrated on an outer surface of the roof. The collapsible shelter system may be located such that it creates a sun-aligned condition, wherein the solar panels are reasonably 'normal' to the sun such that they receive a maximal amount of energy from the sun. In this sun-aligned condition, the set of solar panels is functionally facing the sun and the plurality of wheels are at a first location. The collapsible shelter system may be further located in a misaligned condition that requires repositioning to align the solar panels to the sun (i.e., to achieve sun-aligned condition). To reposition the set of solar panels when they are misaligned to the sun, the plurality of wheels are moved to a second location that is different than the first location whereby the set of solar panels are, once again, properly/maximally aligned to the sun.

In one illustrative configuration, a collapsible shelter system is disclosed. The collapsible shelter system may include a base defining a front edge, a back edge, a first side edge and a second side edge; a roof defining a front edge, a back edge, a first side edge and a second side edge; and a first side wall defining an inside surface and an outside surface oppositely disposed from the inside surface. The first side wall of the collapsible shelter system may further include a lower portion hingedly attached to the base along the first side edge of the base and an upper portion hingedly attached to the roof along the first side edge of the roof; wherein the lower portion is hingedly attached to the upper portion along a middle-hinge axis. The collapsible shelter system may further include a second side wall defining an inside surface and an outside surface oppositely disposed from the inside surface. The second side wall may include a lower portion hingedly attached to the base along the second side edge of the base and an upper portion hingedly attached to the roof along the second side edge of the roof; wherein the lower portion is hingedly attached to the upper portion along a middle-hinge axis. The system may further include one or more translating hinge assemblies configured for attaching the base with the roof along the front edge of the base and the front edge of the roof, wherein each of the one or more translating hinge assemblies provides for translational movement and for rotational movement of the roof with respect to the base. If so provided, the one or more translating hinge assemblies may include a fixed part configured to be attached to the base, a guide path configured within the fixed part, a movable part configured to be attached to the roof, a catch portion configured within the movable part, and a pin configured to couple the fixed part with the movable part by cooperating with the guide path and the catch portion. Upon coupling, the pin may provide for a vertical movement of the movable part relative to the fixed part corresponding to a translation of the pin within the guide path, and a simultaneous rotational movement of the movable part relative to the fixed part corresponding to the translation of the pin within the guide path. The collapsible shelter system may be in a closed position or an open position. In the closed position, each of the first side wall and the second side wall is folded about the middle-hinge axis; wherein the upper portions of the inside surface of the first side wall and the second side wall are facing the roof, the lower portions of the inside surface of the first side wall and the second side wall are facing the base, the upper portions of the outside surface of the first side wall and the second side wall are facing the respective lower portions of the outside surface of the first side wall and the second side wall, and the middle-hinge axis of the first side wall aligns with the middle-hinge axis of the second side wall. Further, in the closed position, the movable part of the translating hinge assembly is positioned at a first location. In the open position, each of the first side wall and the second side wall is perpendicular to the base and to the roof, the roof is non-parallel to the base, the middle-hinge axis of the first side wall is parallel to the middle-hinge axis of the second side wall, and the movable part of the translating hinge assembly is positioned at a second location that different than the first location. This movement causes the front edge of the collapsible shelter system to be 'closed' for travel at traffic speed without concern for unintended opening. The deployment/opening of the collapsible shelter system is easily initiated by moving a latch.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include:

FIG. 3 illustrates an assembly of the base and the roof coupled via translating hinge assemblies, in accordance with some embodiments.

FIG. 4 illustrates a perspective view of a translating hinge assembly in an unassembled state, in accordance with some embodiments.

FIG. 5 illustrates a side view of the translating hinge assembly in an unassembled state, in accordance with some embodiments.

FIG. 6 illustrates a front view of the translating hinge assembly in an unassembled state, in accordance with some embodiments.

FIG. 18 shows another exploded view of an unassembled adjustable mount, in accordance with some embodiments.

FIG. 19 shows a side view of the assembled adjustable mount, in accordance with some embodiments.

FIG. 20 shows a front view of the assembled adjustable mount, in accordance with some embodiments.

FIG. 44 is a flowchart of a method of assembling the collapsible shelter system, in accordance with some embodiments.

FIG. 45 is a flowchart of a method of installing the collapsible shelter system on a rooftop of a vehicle, in accordance with some embodiments.

FIG. 46 is a flowchart of a method of assembling a window for the collapsible shelter system, in accordance with some embodiments.

In the appended figures, similar components and/or features may have the same numerical reference label. Further, various components of the same type may be distinguished by following the reference label with a letter. If only the first numerical reference label is used in the specification, the description is applicable to any one of the similar components and/or features having the same first numerical reference label irrespective of the suffix.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as exemplary only, with the true scope and spirit being indicated by the following claims.

It is desirable to provide a lightweight, portable, and collapsible shelter system that is durable, safe, and comfortable. Ideally (in a separate aspect of the disclosure), it is desirable provide a mounting system and to provide an associated technique for mounting structures (e.g., the collapsible shelter system) on a vehicle. Further it is further desirable to provide a manufacturing technique and the finished system of a window with at least one stretched panel (e.g., translucent plastic) that provides shelter from the environment (and if two stretched panels, an airgap for heat and sound insulation purposes). These illustrative examples are some of the benefits will be evident in the present disclosure (other aspects and associated benefits exist that are described herein).

Figure 1A:
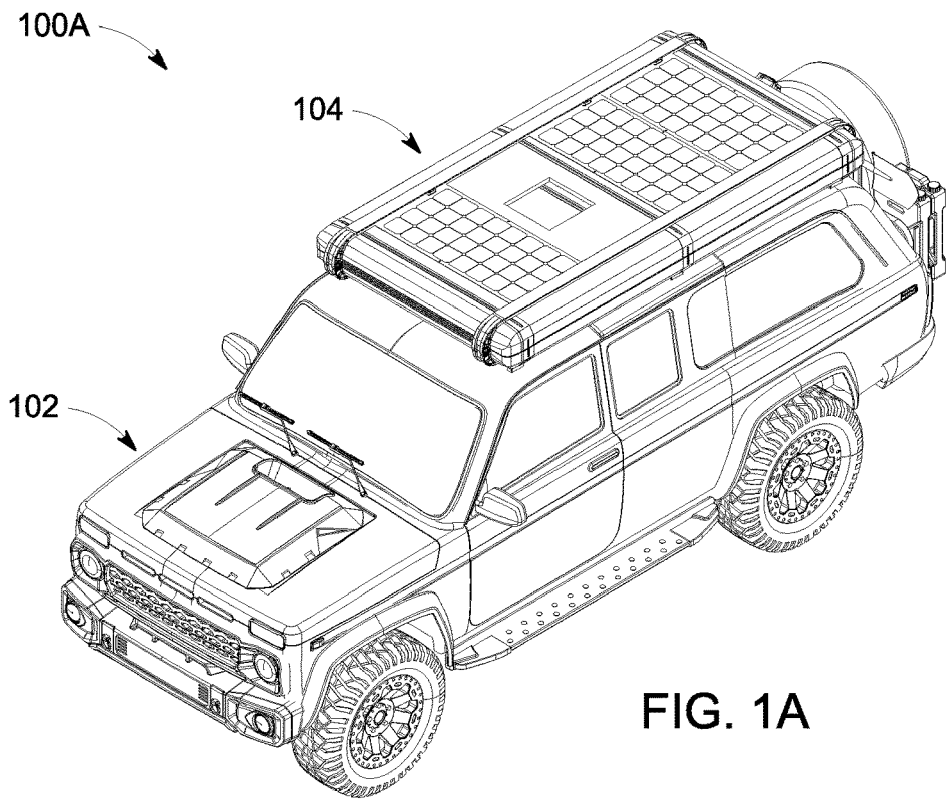
FIG. 1A illustrates a perspective view of an exemplary collapsible shelter system mounted atop a vehicle and in a closed position, in accordance with some embodiments of the present disclosure.
Figure 1B:
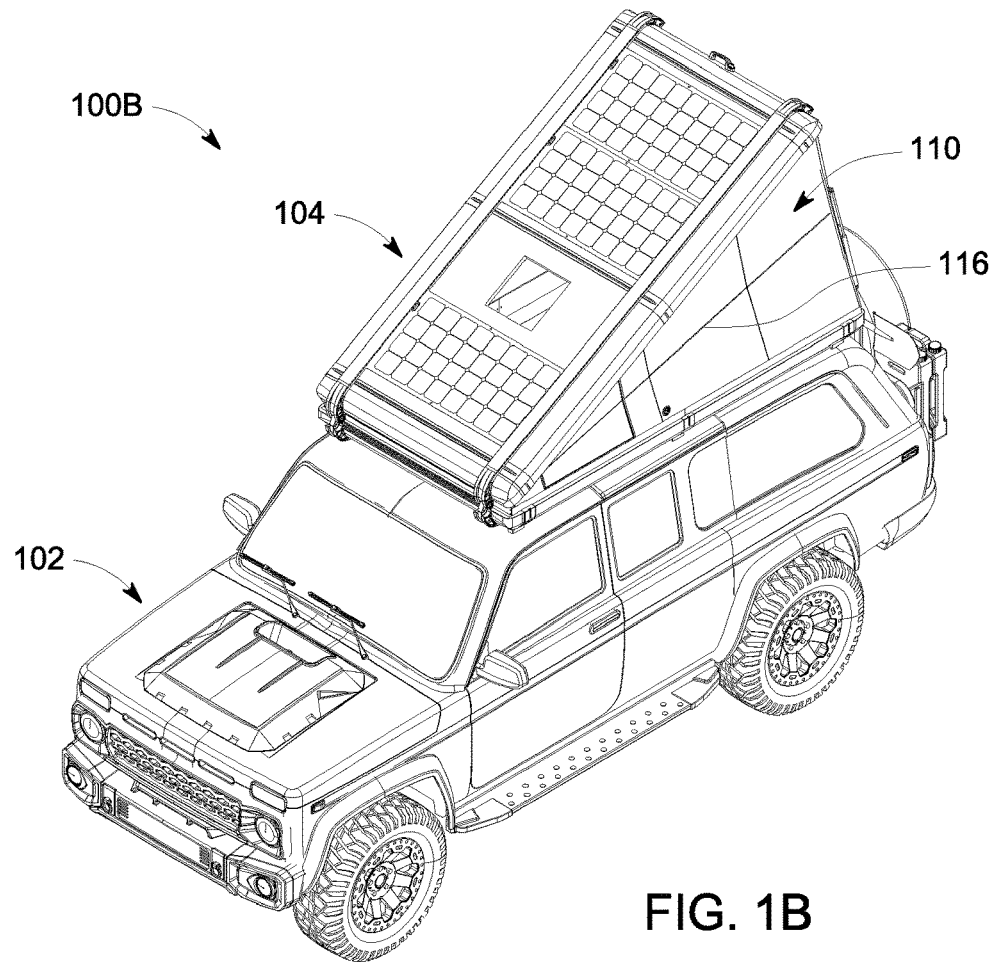
FIG. 1B illustrates a perspective view of the collapsible shelter system, in an open position while mounted atop the vehicle, in accordance with some embodiments.

Referring now to FIG. 1A, a perspective view 100A of an exemplary collapsible shelter system 104, mounted atop a vehicle 102 and in a closed position, is illustrated in accordance with some embodiments of the present disclosure. In the closed position, the collapsible shelter system 104 is compact and substantially planar to a rooftop of the vehicle. In particular, the collapsible shelter system 104 is nominally parallel to the rooftop of the vehicle, independent of a contour of the rooftop of the vehicle. As used herein, the phrase "nominally parallel" means that the base is parallel to a tangent, at the apex of the rooftop of the vehicle. When required, the collapsible shelter system 104 may be deployed to provide shelter to one or more persons (and/or items). For example, referring now to FIG. 1B, a perspective view 100B of the collapsible shelter system 104, in an open position while mounted atop the vehicle 102, is illustrated in accordance with some embodiments of the present disclosure. In the illustrated embodiments, the collapsible shelter system 104 is fitted on the rooftop of the vehicle 102 (e.g., 4×4 trucks). However, it should be noted that, in alternative embodiments, the collapsible shelter system 104 may be fitted on an open or a covered rear of a pick-up truck or a trailer. Further, it should be noted that, in alternative embodiments, the collapsible shelter system 104 may be deployed on a substantially flat ground, a movable system, vessel, and/or structure. As illustrated, the collapsible shelter system 104 has foldable side walls 110 to facilitate transition between the closed position and the open position. Each of the foldable sides may fold along a folding line 116 (also referred to as middle-hinge axis 116) running nearby or coincident to the middle of the foldable side walls 110. The collapsible shelter system 104 is described in greater detail below in conjunction with FIGS. 2-43.

Figure 2A:
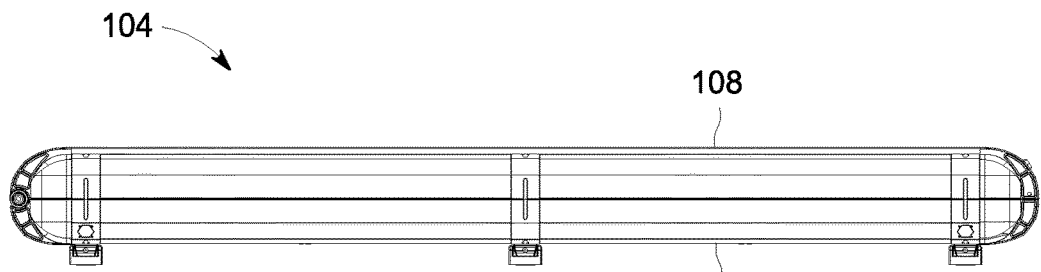
FIG. 2A illustrates a side view of the collapsible shelter system in the closed position, in accordance with some embodiments.
Figure 2B:
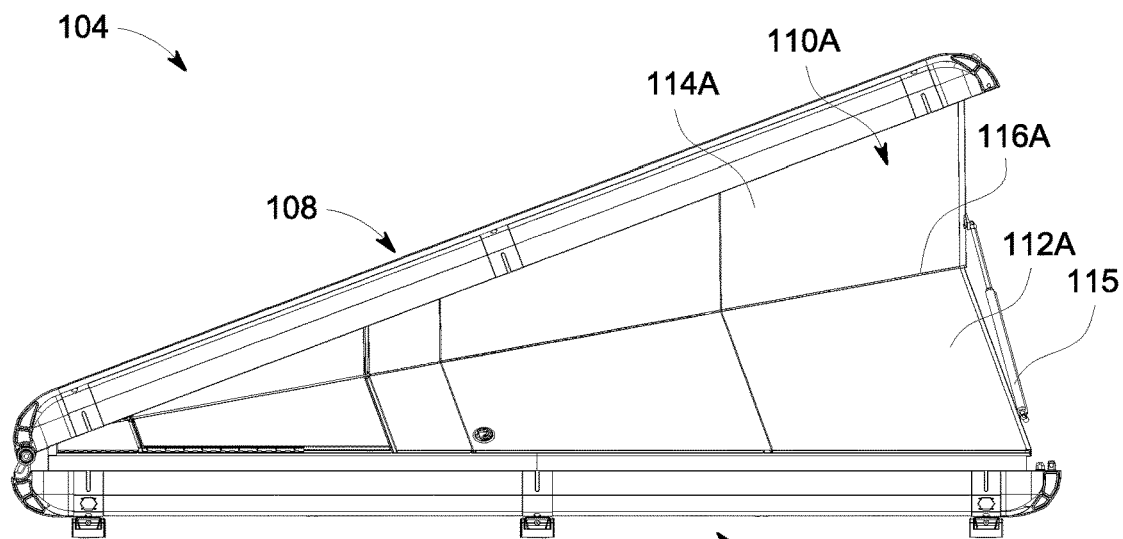
FIG. 2B illustrates a side view of the collapsible shelter system in an intermediate position, in accordance with some embodiments.
Figure 2C:
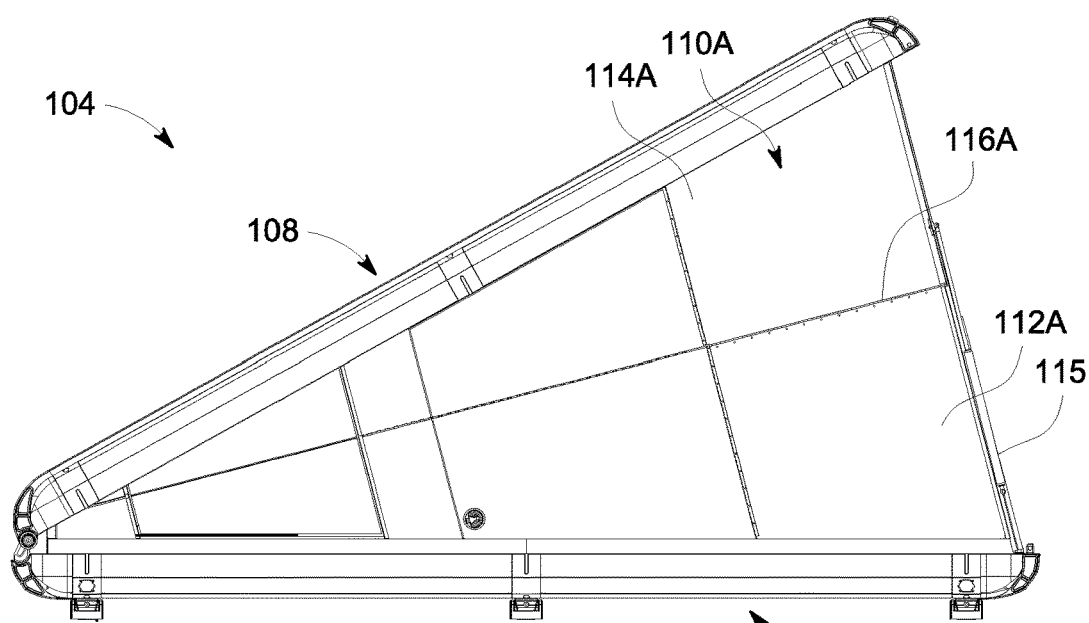
FIG. 2C illustrates a side view of the collapsible shelter system in the open position, in accordance with some embodiments.
Figure 2D:
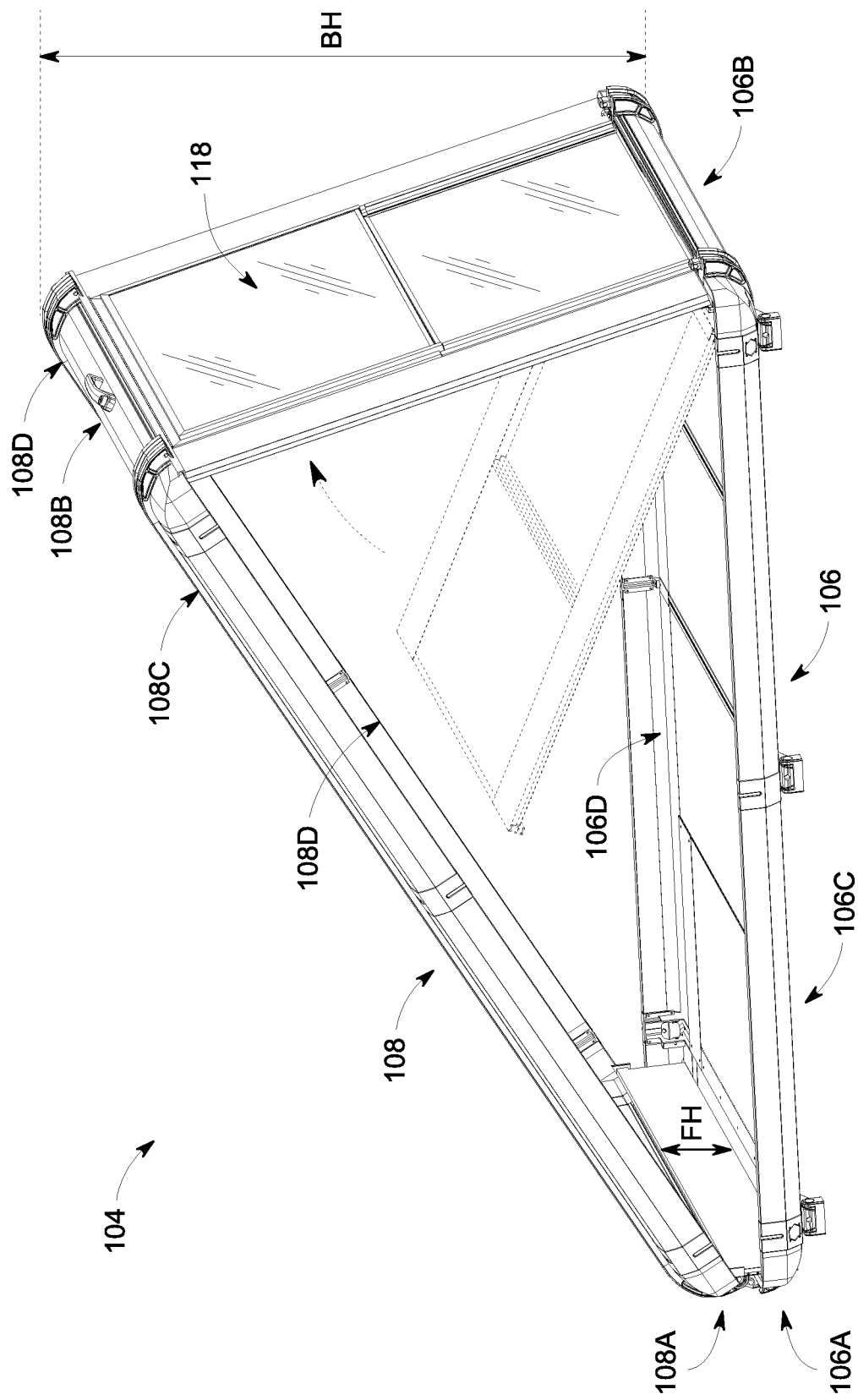
FIG. 2D illustrates a perspective view of an inside of the collapsible shelter system in the open position, in accordance with some embodiments.
Figure 2E:
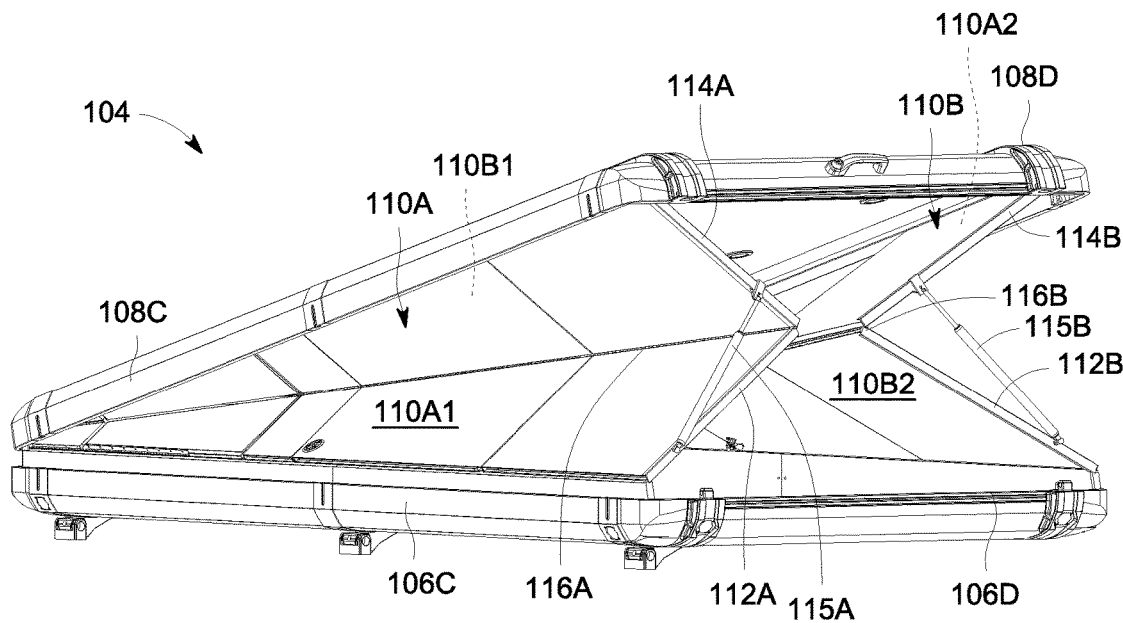
FIG. 2E illustrates another perspective view of the collapsible shelter system in the intermediate position, in accordance with some embodiments.
Figure 2F:
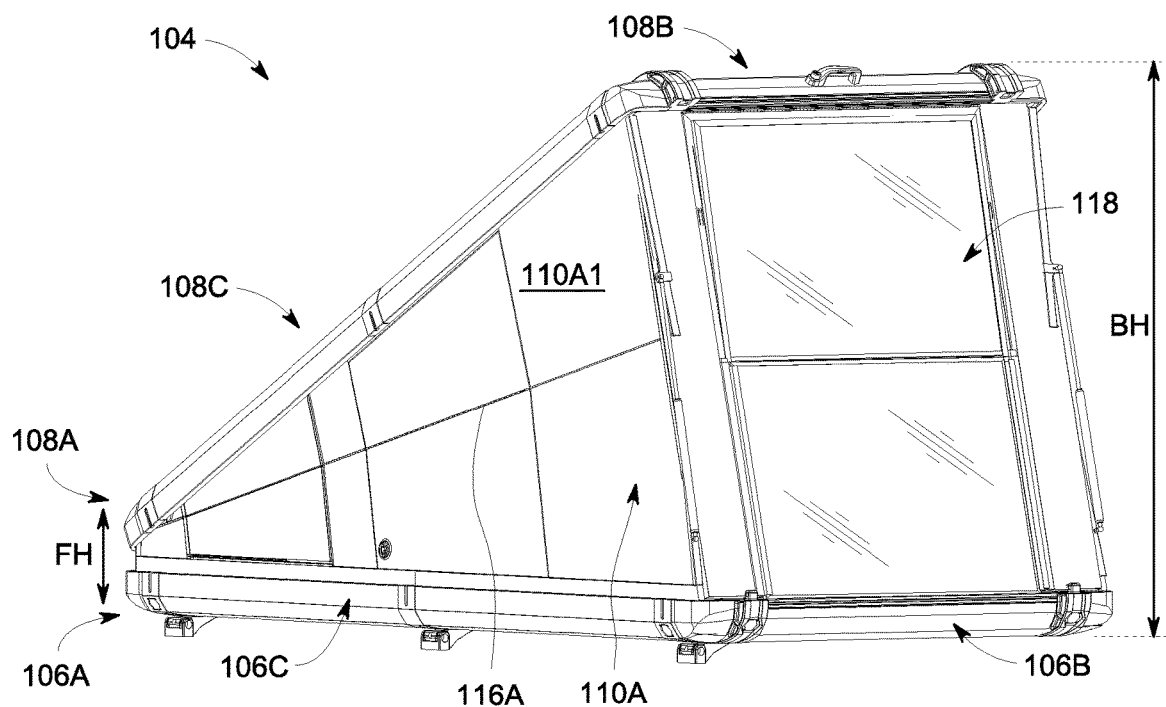
FIG. 2F illustrates another perspective view of the collapsible shelter system in the open position, in accordance with some embodiments.

Referring now to FIGS. 2A-2F, different views in different stages of deployment of the collapsible shelter system 104 are illustrated in accordance with some embodiments of the present disclosure. For example, FIG. 2A illustrates a side view of the collapsible shelter system 104 in the closed position. Further, FIG. 2B illustrates a side view of the collapsible shelter system 104 in an intermediate position (i.e., somewhere between the closed position and the open position). Further, FIG. 2C illustrates a side view of the collapsible shelter system 104 in the open position (i.e., when it is deployed to provide shelter). FIG. 2D illustrates a perspective view of an inside of the collapsible shelter system 104 (i.e., two side walls are not shown) in the open position. Further, FIG. 2E illustrates a perspective view of the collapsible shelter system 104 in the intermediate position. Moreover, FIG. 2F illustrates a perspective view of the collapsible shelter system 104 in the open position.

As shown in the FIGS. 2A-2F, the collapsible shelter system 104 may include a base 106 and a roof 108. The base 106 may be substantially rectangular and defined by a front edge 106A, a back edge 106B, a first side edge 106C, and a second side edge 106D. Similarly, the roof 108 may be substantially rectangular and defined by a front edge 108A, a back edge 108B, a first side edge 108C, and a second side edge 108D. It should be noted that the base 106 and the roof 108 may be substantially proportionate to each other. A front height (FH) may be defined by the distance between the front edge 106A of the base 106 and the front edge 108A of the roof 108. Further, a back height (BH) may be defined by the distance between the back edge 106B of the base 106 and the back edge 108B of the roof 108.

As will be appreciated, in the open position, the collapsible shelter system 104 may take a substantially triangular configuration such that the front height (FH) may be lesser than the back height (BH). It should be noted that such configuration may have multiple advantages. For example, the substantially triangular configuration may provide aerodynamic advantage. Thus, when the collapsible shelter system 104 in the open position during high wind, the substantially triangular configuration shall deflect the wind and, therefore, reduce any rattling of the shelter. Further, the substantially triangular configuration shall provide greater stability to the overall design of the collapsible shelter system 104, as compared to a rectangle-shaped collapsible shelter system. Moreover, the substantially triangular configuration may be advantageous in terms of a compact design and better inside space utilization. The inclined roof helps avoid building-up of snow or of water from rain or melting snow. Further, as will be described in greater detail below, the inclined roof may help ensuring optimal facing of the solar panels installed on the roof to the direction of the sun through the say.

The collapsible shelter system 104 may include a first side wall 110A and a second side wall 110B. This first side wall 110A may be defined by an outside surface 110A1 and an inside surface 110A2. The outside surface 110A1 may be oppositely disposed from the inside surface 110A2. Similarly, the second side wall 110B may define an outside surface 110B1 oppositely disposed from an inside surface 110B2.

The first side wall 110A may include a lower portion 112A hingedly attached to the base 106 along the first side edge 106C. The first side wall 110A may further include an upper portion 114A hingedly attached to the roof 108 along the first side edge 108C. Further, the lower portion 112A may be hingedly attached to the upper portion 114A along a middle-hinge axis 116A (also referred to as folding line in FIG. 1B). In other words, in the open position, the lower portion 112A and the upper portion 114A may cooperate to form the first side wall 110A. Similarly, the second side wall 110B may include a lower portion 112B hingedly attached to the base 106 along the second side edge 106D, and an upper portion 114B hingedly attached to the roof 108 along the second side edge 108D. Further, the lower portion 112B may be hingedly attached to the upper portion 114B along a middle-hinge axis 116B. In the open position, the lower portion 112B and the upper portion 114B may cooperate to form the second side wall 110B.

In the closed position, the first side wall 110A and the second side wall 110B may be folded about their respective middle-hinge axes 116A and 116B. Further, in the closed position, the upper portions 114A, 114B of the inside surface 110A2, 110B2 of the first side wall 110A and the second side wall 110B are facing the roof 108, while the lower portions 112A, 112B of the inside surface 110A2, 110B2 of the first side wall 110A and the second side wall 110B are facing the base 106. Moreover, in the closed position, the upper portions 114A, 114B of the outside surface 110A1, 110B1 of the first side wall 110A and the second side wall 110B are facing the respective lower portions 112A, 112B of the outside surface 110A1, 110B1 of the first side wall 110A and the second side wall 110B.

As will be appreciated, the dimensions of the first side wall 110A may be substantially same as the dimensions of the second side wall 110B. Similarly, the lower portion 112A and the upper portion 114A of the first side wall 110A may be substantially proportionate to the lower portion 112B and the upper portion 114B of the second side wall 110B, respectively. Thus, in the closed position, the middle-hinge axis 116A of the first side wall 110A aligns with the middle-hinge axis 116B of the second side wall 110B. Further, the middle-hinge axis 116A of the first side wall 110A and the middle-hinge axis 116B of the second side wall 110B may both fall on an imaginary plane that may be substantially parallel to the base 106 and to the roof 108. In fact, even in the open position or the intermediate position, the middle-hinge axis 116A of the first side wall 110A may remain aligned with the middle-hinge axis 116B of the second side wall. 110B. In other words, the middle-hinge axis 116A of the first side wall 110A may be parallel to the middle-hinge axis 116B of the second side wall 110B. However, in the open position or the intermediate position, the middle-hinge axis 116A and the middle-hinge axis 116B may both fall on an imaginary plane that is inclined to the base 106 (i.e., not parallel to the base 106 or to the roof 108). In other words, as the collapsible shelter system 104 is transitioned from the closed position to the open position or vice versa, the middle-hinge axis 116A may continue to align with the middle-hinge axis 116B throughout the transition.

In the open position, each of the first side wall 110A and the second side wall 110B is perpendicular to the base 106 and to the roof 108. The roof 108 is inclined to the base 106 (i.e., non-parallel to the base). As stated above, in the open position, the middle-hinge axis 116A of the first side wall 110A is parallel to the middle-hinge axis 116B of the second side wall 110B. Further, as stated above, the back height (BH) is greater than the front height (FH).

As will be appreciated, the transitioning of the collapsible shelter system 104 between the closed and the open position is facilitated by one or more translating hinge assemblies that couple the base 106 and the roof 108. Each of the one or more translating hinge assemblies may be configured for hingedly attaching the base 106 with the roof 108, and for example, allowing the roof 108 to be pivoted relative to the base 106 near the front edge 106A of the base 106 and the front edge 108A of the roof 108.

Further, it may be desirable to have at least some front height (FH) (defined by the distance between the front edge 106A of the base 106 and the front edge 108A of the roof 108) in the open position. For example, in the closed position, it may be desirable to have the front height (FH) so as to create space for objects (e.g., mattress, etc.) and foldable side walls without compromising on the compactness of the collapsible shelter system 104. Similarly, in the open position, it may be desirable to have the front height (FH) so as to provide for foot room (in the sleeping position). To this end, each of the one or more translating hinges assemblies may provide for vertical movement relative to the base 106 while allowing the roof 108 to be pivoted relative to the base 106. In other words, each of the one or more translating hinges assemblies may provide for translational movement and for rotational movement of the roof 108 with respect to the base 106. A translating hinge assembly is explained in greater detail in conjunction with FIGS. 3-6.

The collapsible shelter system 104 may further include a first gas strut 115A connecting the lower portion 112A and the upper portion 114A of the first side wall 110A. Further, the collapsible shelter system 104 may include a second gas strut 115B (as shown in the FIG. 2E) connecting the lower portion 112B and the upper portion 114B of the second side wall 110B. Each of the first gas strut 115A and second gas strut 115B be hydraulic or pneumatic piston-cylinder assemblies. For example, the first gas strut 115A and the second gas strut 115B may cause to temporarily hold the positions of the lower portions 112A, 112B and the upper portions 114A, 114B of the first side wall 110A and the second side wall 110B when the collapsible shelter system 104 is in open or closed position. Further, in order to transition the collapsible shelter system 104 between open or closed position, manual effort may be required to overcome the effect of the first gas strut 115A and the second gas strut 115B. It may be noted that each of the first gas strut 115A and the second gas strut 115B may be coupled to the side walls 110A, 110B, via joints that allow rotation in two planes, for example, ball joints. This allows the first gas strut 115A and the second gas strut 115B to rotate about these joints, while the collapsible shelter system 104 undergoes transition between the open and closed position.

The collapsible shelter system 104 may further include a back wall 118. The back wall 118 may be hingedly attached to the base 106 along the back edge 106B of the base 106. The back wall 118 may therefore be configured to rotate about the back edge 106B to assume the closed position or an open position. It may be noted that, in the closed position, the back wall 118 may be collapsed to the base 106. In other words, in the closed position, the back wall 118 may be rested on the base 106. Similarly, it may be noted that, in the open position, the back wall 118 may be securely attached to the roof 108. Thus, in order to transition the back wall 118 into the open position, the back wall 118 may be rotated (as indicated by the arrow) about the back edge 106B to engage with the back edge 108B of the roof 108. The back wall 118 is further explained in detail in conjunction with FIGS. 10-14.

It may be noted that, in some embodiments, one or more parts like each of the base 106, the roof 108, the first side wall 110A, the second side wall 110B, and the back wall 118 may be molded from a carbon fiber reinforced polymer using prepreg carbon fiber molding process. It may be noted that during the molding process, one or more parts, especially, the edges and corners of the one or more parts may be molded along with a flange, using a molding member. The resulting one or more molded parts with the flange facilitate modular assembly of the collapsible shelter system, by fitting securely into key tracks. The flange is secured to the key tracks using nuts, rivets, or other types of fasteners that is applied in proximity (e.g., every 6 inches) to one another. Once secured, a sealant may be applied to prevent any water or dust intensions. The sealant may be flexible urethane, liquid silicone, or other such waterproof and heat proof sealant.

It should be noted that a simple, but an effective technique is employed to mold the flange in the corner pieces of the walls, in accordance with some embodiments of the present invention. The molding tool may include an aluminum angle piece which is inserted into the molding tool for forming the flange in each piece of carbon fiber corners. As will be appreciated, the angle piece enables manufacturing of the corners with the flange. The aluminum angle piece not only facilitated molding of the corer edge with the flange, but also helps in popping out the mold from the molding tool once it is ready.

With reference to FIG. 3, an assembly 200 of the base 106 and the roof 108 coupled via translating hinge assemblies 202A, 202B is illustrated in accordance with some embodiments of the present disclosure. Further, FIG. 4 illustrates a perspective view of a translating hinge assembly 202 in an unassembled state. FIG. 5 illustrates a side view of the translating hinge assembly 202 in an unassembled state, and FIG. 6 illustrates a front view of the translating hinge assembly 202 in an unassembled state.

As shown in the FIGS. 3-6, the translating hinge assembly 202 may include a fixed part 204 having a guide path 206. The fixed part 204 may be configured to be attached to the base 106 of the collapsible shelter system 104. For example, the fixed part 204 may be attached to the base 106 via fasteners like bolts, screws, rivets, etc., or attached permanently, for example, via welding. It may be noted that the guide path 206 may include a slot 206A which may be oriented substantially vertically. Further, in some embodiments, the slot 206A may have an arc (i.e., the slot 206A may not be completely straight). It may be further noted that the fixed part 204 may be manufactured from a rigid material like a metal, an alloy, a polymer, etc. Further, the fixed part 204 and the guide path 206 may be made as a single piece. Alternately, the guide path 206 may be made as separate part and the fitted to the fixed part 204. The guide path 206 may be made of a rigid material like a metal, or an alloy, etc.

The translating hinge assembly 202 may further include a movable part 208. The movable part 208 may include a catch portion 210. The movable part 208 may be configured to be attached to the roof 108 of the collapsible shelter system 104. For example, the movable part 208 may be attached to the roof 108 via fasteners like bolts, screws, rivets, etc., or attached permanently via welding, and the like. Further, the movable part 208 may be manufactured from a rigid material like a metal, an alloy, a polymer, etc. Further, the movable part 208 and the catch portion 210 may be made as a single piece. Alternately, the catch portion 210 may be made as a separate part and then fitted to the movable part 208. The catch portion 210 may be made of a rigid material like a metal, an alloy, or a polymer, etc.

In some embodiments, as shown in the FIGS. 4, 5, the catch portion 210 may include two legs 210A, 210B. Further, each of the two legs 210A, 210B may include a hole, i.e., the leg 210A may include a hole 210A1 and leg 210B may include a hole 210B1. Further, the hole 210A1 and hole 210B1 may share a common axis. In other words, the hole 210A1 and hole 210B1 may be aligned along one straight line.

It may be noted that the guide path 206 may be configured to be coupled with the catch portion 210, via the two legs 210A, 210B. In order to couple the guide path 206 with the catch portion 210, the translating hinge assembly 202 may further include a pin 212. The pin 212 may be an elongated cylindrical body having a circular cross section. The pin 212 is configured to couple the fixed part 204 with the movable part 208 by cooperating with the guide path 206 and the catch portion 210.

The pin 212 may couple the fixed part 204 with the movable part 208, by coupling the guide path 206 (of the fixed part 204) with the catch portion 210 (of the movable part 208). In order to couple the guide path 206 with the catch portion 210, the slot 206A of the guide path 206 may be aligned with the holes 210A1, 210B1. The pin 212 may be inserted in the one of the holes 210A1, 210B1 to then pass through the slot 206A and then eventually insert into the other hole of the holes 210A1, 210B1.

The translating hinge assembly 202 provides for vertical movement of the movable part 208 relative to the fixed part 204 corresponding to a translation of the pin 212 within the guide path 206. It may be noted that once the guide path 206 is coupled with the catch portion 210 via the pin 212, the slot 206A of the guide path may allow the pin 212 (and hence the movable part 208) to translate along the profile (e.g., arc) of the slot 206A. As it will be understood, this translation of the pin 212 within the slot 206A of the guide path 206 may provide for vertical movement of the movable part 208 relative to the fixed part 204.

As mentioned earlier, it may be desirable to have the front height to be greater in the open position as compared to that in the closed position of the collapsible shelter system 104. As such, the movable part 208 must undergo a vertical (upwards) movement relative to the fixed part 204, when the collapsible shelter system undergoes a translation from the closed position to the open position. Such, vertical (upwards) movement may be enabled by the translating hinge assembly 202, as explained above.

Further, the translating hinge assembly 202 may simultaneously provide for rotational movement of the movable part 208 relative to the fixed part 204. As it will be understood, due to the circular cross section of the pin 212, the pin is free to rotate within the slot 206A of the guide path 206. As a result, the catch portion 210 of the movable part 208 may also be free to rotate within the slot 206A of the guide path 206. Therefore, this rotational movement of the movable part 208 relative to the fixed part 204 allows for the roof 108 to rotate relative to the base 106, to thereby allow the collapsible shelter system 104 to undergo the translation from the closed position to the open position, and vice versa.

Figure 7A:
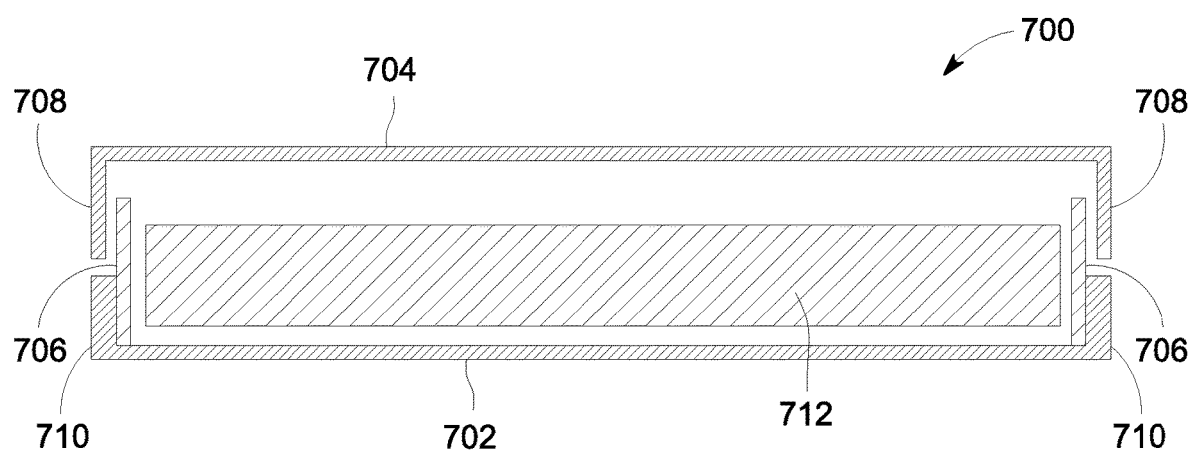
FIG. 7A is a schematic diagram of a collapsible shelter system in a closed position, in accordance with some embodiments.
Figure 7B:
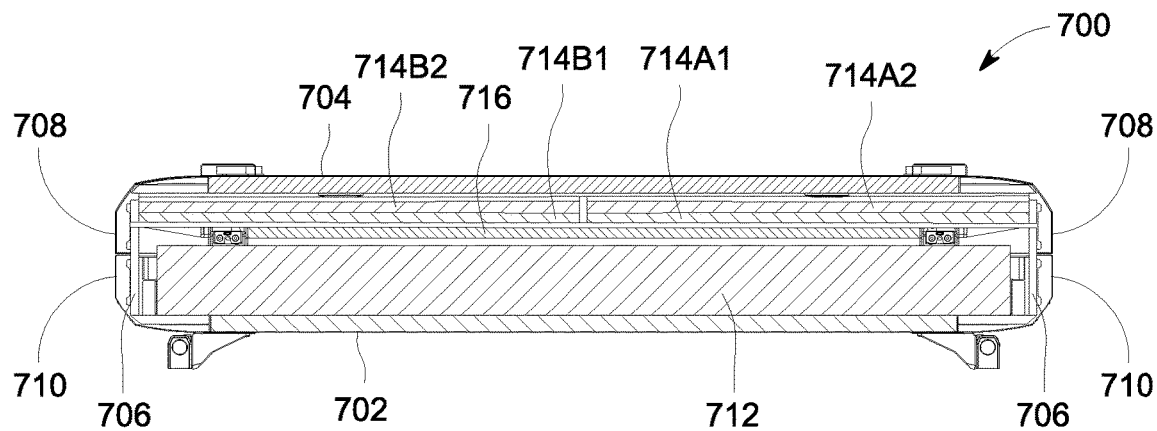
FIG. 7B illustrates a sectional front view of the collapsible shelter system, in accordance with some embodiments.

With reference to FIG. 7A, a schematic diagram of a collapsible shelter system 700 (corresponding to the collapsible shelter system 104) in a closed position is illustrated in accordance with some embodiments of the present disclosure. FIG. 7B is sectional front view of the collapsible shelter system 700. The collapsible shelter system 700 includes a base 702 (corresponding to the base 106) and a roof 704 (corresponding to the roof 108). It may be noted that the base 702 may include walls 710 along each of the edges (i.e., the front edge 106A, the back edge 106B, side edges 106C, 106D) of the base 702. For example, walls along the side edges 106C, 106D of the base 106 can be seen in the FIG. 7B. The walls 710 may be projecting outside the planar surface of the base 702. Similarly, the roof 704 may include walls 708 along each of the edges (i.e., the front edge 108A, the back edge 108B, side edges 108C, 108D) of the roof 704. It may be understood that, in the closed position of the collapsible shelter system 700, the walls 708 of the roof 704 may be positioned over the walls of the 710 of the base 702. As such, a space is created inside the confines of the walls 710 (of the base 702) and the walls 708 (of the roof 704).

In some embodiments, as shown in the FIGS. 7A-7B, the base 702 of the collapsible shelter system 700 may include an ingress guard 706706. The ingress guard 706706 may run along an inside periphery of the base 702, i.e., along the walls 710 of the base 702.

In some embodiments, the ingress guard 706 may include four plate-shaped members, with each plate-shaped member configured to be positioned along an edge of the four edges of the base 702 of the collapsible shelter system 700. In some embodiments, each of these plate-shaped members may be formed as part of the collapsible shelter system 700. Alternately, each of the plate-shaped members may be formed separately and configured to be fitted to the collapsible shelter system 700. Further, in some embodiments, the plate-shaped members may be formed as a single piece, i.e., in form of a rectangular body having a shape and size proportionate to that of the base 702.

It may be noted that the height of the ingress guard 706, i.e., the height of the plate-shaped members may be greater than the height of the walls 710 of the base 702. Further, the periphery defined by the ingress guard 706 may be smaller than the periphery defined by the walls 708 of the roof 704. As such, in the closed position, as shown in the FIGS. 7A-7B, the walls 708 of the roof 704 may be positioned around the ingress guard 706 towards the outside. It may be further noted that, by way of the above, the ingress guard 706 create a tortuous path for water, dust, or other matter trying to move from the exterior to the interior of the collapsible shelter system 700. In other words, the ingress guard 706 prevents or minimizes ingress of the water, dust, or other matter through any gap which may exist between the base 702 and the roof 704 in the closed position of the collapsible shelter system 104. Further, in some embodiments, side walls 714A, 714B (corresponding to the side walls 110A, 110B) of the collapsible shelter system 700 may be mounted on the top of the plate-shaped members of the ingress guard 706. In particular, the side walls 714A, 714B may be hingedly attached to the plate-shaped members along the top of the plate-shaped members. Further, a lower portion 714A1 and an upper portion 714A2 of a first side wall 714A are folded away from the base 702. Similarly, a lower portion 714B1 and an upper portion 714B2 of a second side wall 714B are folded away from the base 702. This allows for enough internal space for objects (e.g., the mattress 712) to be positioned inside the collapsible shelter system 700. It may be noted that, in the closed position, the mattress may be positioned between the base 702 and the lower portions 714A1, 714B1 of the inside surface of the first side wall 714A and the second side wall 714B, respectively. Further, as shown in the FIG. 7B, a back wall 716 (corresponding to the back wall 118) may be positioned towards the roof 704. In fact, in some embodiments, the back wall 716 may be mounted on the top of the ingress guard 706, i.e., the back wall 716 may be hingedly attached to the top of the ingress guard 706.

Figure 8:
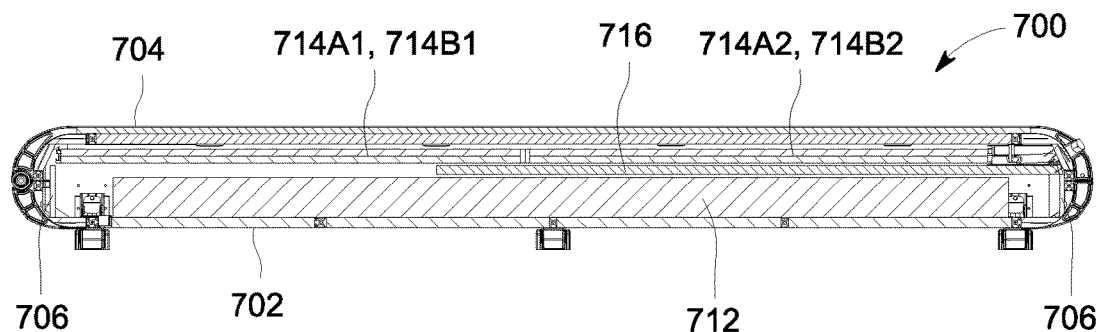
FIG. 8 illustrates a sectional side view of the collapsible shelter system, in accordance with some embodiments.

Referring now to FIG. 8, a sectional side view of the collapsible shelter system 700 in the closed position is illustrated. As such, walls 710 of the ingress guard 706 along the front edge 106A and back edge 106B of the base 106 can be seen in the FIG. 8. Further, it can be seen that the lower portion 714A1 and the upper portion 714A2 of the first side wall 714A, and the lower portion 714B1 and the upper portion 714B2 of the second side wall 714B are folded away from the base 702.

Figure 9:
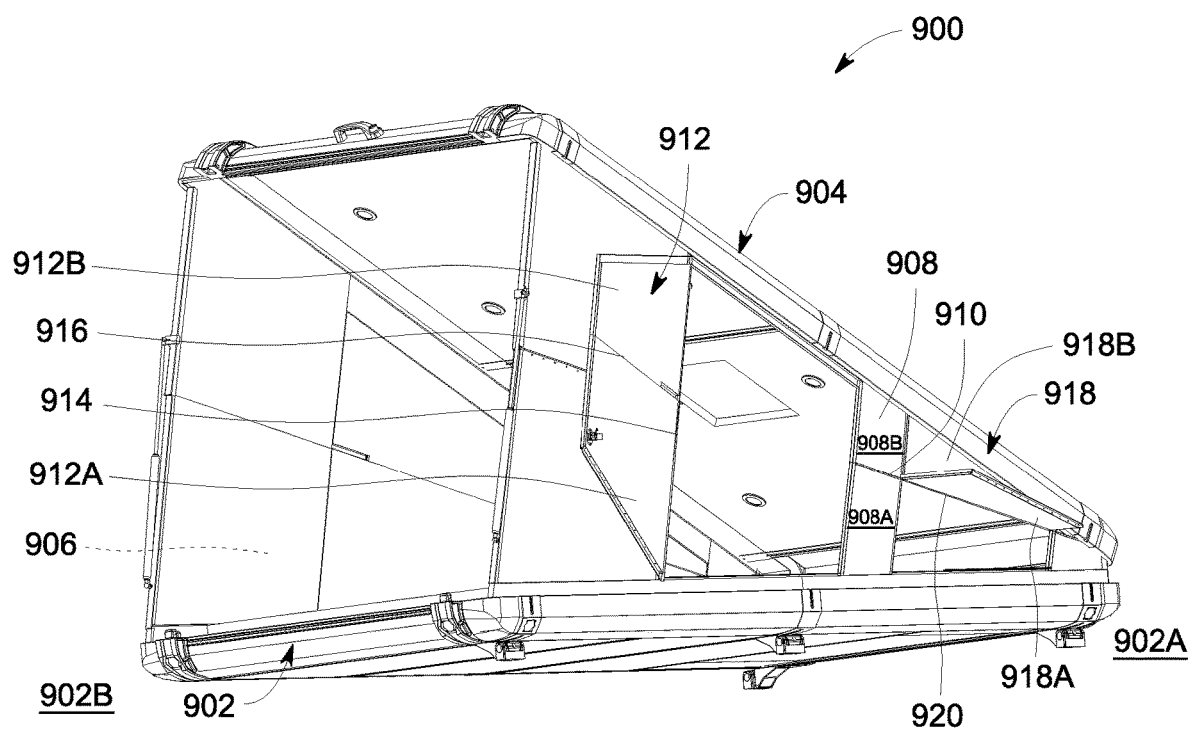
FIG. 9 illustrates a perspective view of a collapsible shelter system, in accordance with some embodiments.

Referring now to FIG. 9, a perspective view of a collapsible shelter system 900 (corresponding to the collapsible shelter system 104) is illustrated in accordance with some embodiments of the present disclosure. The collapsible shelter system 900 may include a base 902 and a roof 904. Further, the collapsible shelter system 900 may include a first side wall 906 and a second side wall 908. Further, each of the first side wall 906 and the second side wall 908 may include a lower portion hingedly attached to a base 902 and an upper portion hingedly attached to the roof 904. Further, the lower portions may be hingedly attached to the respective upper portions along middle-hinge axes. As shown in the FIG. 9. the second side wall 908 includes a lower portion 908A hingedly attached to the base 902 and an upper portion 908B hingedly attached to the roof 904. Further, the lower portion 908A is hingedly attached to the upper portion 908B along a middle-hinge axis 910.

In some embodiments, the collapsible shelter system 900 may include one or more doors on at least one of the first side wall 906 and the second side wall 908. As such, at least one of the first side wall 906 and the second side wall 908 may include a cut out region, which the door may be configured to close or open. As shown, the second side wall 908 includes a door 912. The door 912 may allow access inside the collapsible shelter system 900. The door 912 may be disposed near a back edge 902B of the base 902.

In some embodiments, the door 912 may include a lower portion 912A hingedly attached to a door frame (along the periphery of the cut out region) carved out in the lower portion (906A, 908A) of the first side wall 906 or the second side wall 908. Further, the door 912 may include an upper portion 912B hingedly attached to a door frame carved out in the upper portion (906B, 908B) of the first side wall 906 or the second side wall 908.

In some embodiments, the door 912 may be hingedly attached substantially perpendicular to the middle-hinge axis 910. In some embodiments, each of the lower portion 912A and the upper portion 912B may be hingedly attached to the second side wall 908 towards the back edge 902 of the base 902 about a hinge axis 914. Therefore, in the open position of the collapsible shelter system 900, the door 912 (i.e., the lower portion 912A and an upper portion 912B of the door) may pivot to rotate about the hinge axis 914, to open or close the door 912. Further, the lower portion 912A and the upper portion 912B may be hingedly attached to each other along the middle-hinge axis 910. In other words, the lower portion 912A and the upper portion 912B may be hingedly attached to each other via a hinge 916 which may be aligned along the middle-hinge axis 910. Therefore, during the transitioning of the collapsible shelter system 900 between the open position and the closed position, the lower portion 912A and the upper portion 912B may rotate relative to each other about the hinge 916. As such, the door 912 may collapse due to the folding of the lower portion 912A and the upper portion 912B about the hinge 916, when the collapsible shelter system 900 is transitioned into the closed position from the open position.

In some alternate embodiments, the door 912 may be slidable substantially perpendicular to the middle-hinge axis 910. To this end, the collapsible shelter system 900 may include one or more tracks (not shown in FIG. 9), for example, fitted parallel to the middle-hinge axis 910. Further, the one or more tracks may extend from the cut out region towards the back edge 902B. Therefore, the door 912 may be configured to be slidably moved along the one or more tracks towards the back edge 902B to open the door 912 (to expose the cut-out region) and slidably moved along the one or more tracks away from the back edge 902B to close the door 912 (to cover the cut-out region).

In some embodiments, at least one of the first side wall 906 and the second side wall 908 may include a window 918 disposed near the front edge 902A. The window 918 may either be fixed, slidable, or hingedly attached perpendicular or parallel to the middle-hinge axis 910. It may be noted that the window 918 may be a dual pane impact resistant window. For example, the window 918 may include an internal screen and an external screen separated by a gap. The gap may be filled by air or a foam. In one illustration, the gap may be filled with an inflatable tube from a tire (e.g. a bicycle tire) that is inflated with a valve (e.g. Shrader or Presta style valve stem) that may, for example, be coated with a fabric tube stitched into a torus-shape. This gap between the internal screen and the external screen may provide for achieving heat insulation and sound insulation, as well as higher strength to resist any impact on the window 918.

The window 918 may include a lower portion 918A and an upper portion 918B, with the lower portion 918A hingedly attached to the upper portion 918B along the middle-hinge axis 910. The upper portion 918B may be fixed to a window frame carved out in the upper portion of the first side wall 906 or the second side wall 908. The lower portion 918A of the window may fit on the window frame carved out in the lower portion of the first side wall 906 or the second side wall 908.

The lower portion 918A and the upper portion 918B may be hingedly attached to each other via a hinge 920. As such, the lower portion 918A and the upper portion 918B may rotate about the hinge 920 to fold or unfold during the transition between the closed position and the open position of the collapsible shelter system 900.

In some embodiments, as shown in the FIG. 9, one or both of the lower portion 918A and the upper portion 918B may be fixed to the lower portion 908A and the upper portion 908B, respectively, of the second side wall 908.

In some alternate embodiments, the lower portion 918A may be hingedly attached to the base 902, and/or the upper portion 918B may be hingedly attached to the roof 904. As such, the lower portion 918A and/or the upper portion 918B may be configured to rotate about the respective hinge to open or close.

In some additional embodiments, at least one of the lower portion 918A and the upper portion 918B may be slidable along a track which may be aligned parallel to the middle-hinge axis 910. As such, the lower portion 918A and/or the upper portion 918B may slide along the track towards the back edge 902B to open and slide towards the front edge 902A to close.

Figure 10:
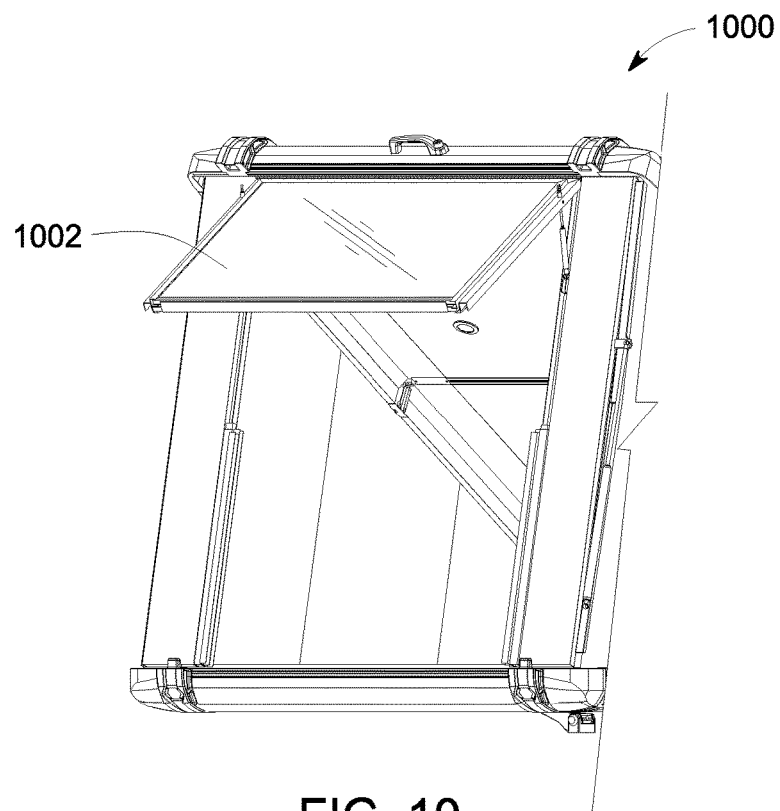
FIG. 10 illustrates a perspective view of a collapsible shelter system, in accordance with some embodiments.

With reference to FIG. 10, a perspective view of a collapsible shelter system 1000 (corresponding to collapsible shelter system 104) is illustrated in accordance with some embodiments of the present disclosure. The collapsible shelter system 1000 may include a back wall 1002 (corresponding to the back wall 118).

Figure 11:
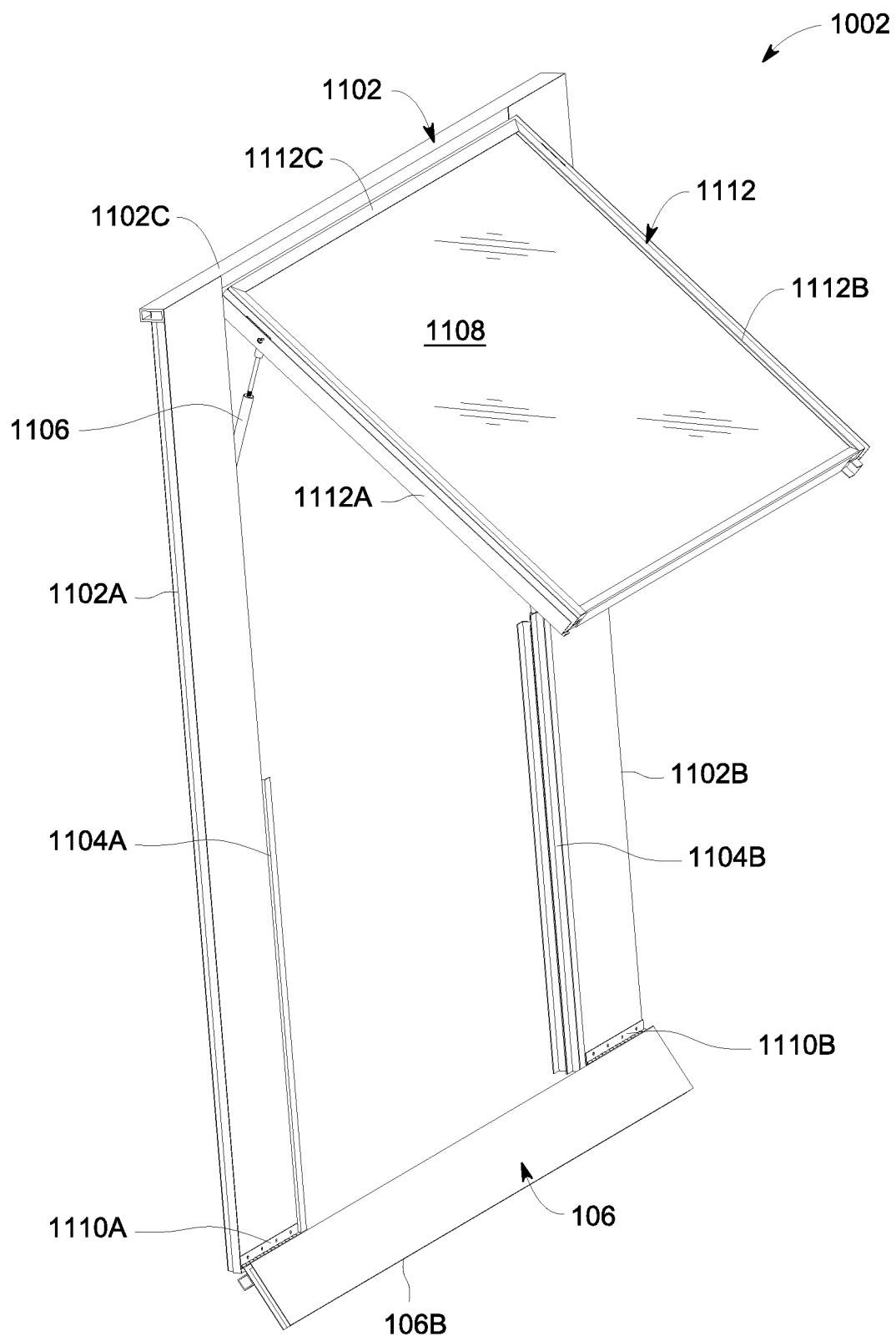
FIG. 11 illustrates a perspective view of a back wall, in accordance with some embodiments.

With reference to FIG. 11, a perspective view of a back wall 1002 is illustrated in accordance with some embodiments of the present disclosure. The back wall 1002 may define an inside surface and an outside surface oppositely disposed from the inside surface. The back wall may be hingedly attached to the base 106 along the back edge 106B of the base 106. In the closed position of the collapsible shelter system, the inside surface of the back wall 1002 may be facing the base 106, and the outside surface of the back wall 1002 may be facing the lower portions of the inside surface of the first side wall and the second side wall. Further, in the open position of the collapsible shelter system, the back wall 1002 may be couplable to the roof along the back edge of the roof.

In some embodiments, the back wall 1002 may include a door. Additionally or alternatively, the back wall 1002 may include a set of two vertically slidable windows 1108.

In some embodiments, the back wall 1002 may include a frame 1102 and the set of two vertically slidable windows 1108. Each of the set of two vertically slidable windows 1108 may be configured to lock near the roof. Upon locking, the window frame 1102 may be configured to move the set of two vertically slidable windows 1108 into an open position.

The frame 1102 may be coupled to the set of two vertically slidable windows 1108 via one or more gas struts 1106. The frame 1102 may include a first side member 1102A, a second side member 1102B, and a top member 1102C. The first side member 1102A and the second side member 1102B may be hingedly attached to the back edge 106B of the base 106 via one or more hinges 1110. In some embodiment, the first side member 1102A and the second side member 1102B may be hingedly attached instead to the ingress guard 706 (i.e., wall 710 of the ingress guard 706), via the one or more hinges 1110. For example, the first side member 1102A (towards its bottom end) may be hingedly attached to the back edge 106B of the base 106 via one or more hinges 1110A. The second side member 1102B (towards its bottom end) may be hingedly attached to the back edge 106B of the base 106 via one or more hinges 1110B. By way of this hinged attachment, the first side member 1102A and the second side member 1102B and therefore the frame 1102 is configured to rotate about the back edge 106B of the base 106.

The frame 1102 may include a sliding track 1104A positioned on an inner side of the first side member 1102A, and a sliding track 1104B positioned on an inner side of the second side member 1102B. The sliding tracks 1104A, 1104B may include at least two tracks, with each track allowing a pane to slide along with track. As such, sliding tracks 1104A, 1104B with two tracks each may allow the two vertically slidable windows to move slidably.

The set of two vertically slidable windows 1108 may include a sub-frame 1112 and two or more vertically slidable windows mounted on the sub-frame 1112. The sub-frame 1112 may include a first side rail 1112A, a second side rail 1112B, and a top rail 1112C defining the three sides of the sub-frame 1112. The set of two vertically slidable windows 1108 is hingedly attached to the top member 1102C of the frame 1102 of the back wall 1002. By way of this hinged attachment, the set of two vertically slidable windows 1108 may be configured to rotate about the top member 1102C of the frame 1102 between a straight position and a slanted position. In the straight position, the set of two vertically slidable windows 1108 may be aligned with the side members 1102A, 1102B of the frame 1102. In the slanted position (as shown in the FIG. 11), the set of two vertically slidable windows 1108 may be aligned at angle with the side members 1102A, 1102B of the frame 1102.

The rotation of the set of two vertically slidable windows 1108 may be controlled by the one or more gas struts 1106. It may be noted that the one or more gas struts 1106 may be hydraulic or pneumatic piston-cylinder assemblies. For example, the gas struts 1106 may cause to temporarily hold the set of two vertically slidable windows 1108 in the straight position or the slanted position. Thus, in order to move the set of two vertically slidable windows 1108 between the straight position and the slanted position, manual effort may be required to overcome the effect of the gas struts 1106.

When the set of two vertically slidable windows 1108 is in the straight position, the first side rail 1112A may align with the first sliding track 1104A, and the second side rail 1112B may align with the second sliding track 1104B. As a result, the first side rail 1112A and the first sliding track 1104A may form a continuous path for the vertically slidable windows to slide across the first side rail 1112A and the first sliding track 1104A. Similarly, the second side rail 1112B and the second sliding track 1104B may form a continuous path. As such, the vertically slidable windows of the set of two vertically slidable windows 1108 may be free to slide and be positioned anywhere on these continuous paths. It may be, therefore, understood that the back wall may be closed by positioning one vertically slidable window towards the top member 1102C and sliding another vertically slidable window vertically downwards towards the back edge 106B of the base 106. Further, the back wall may be opened by sliding any one vertically slidable window from the above positions.

When the set of two vertically slidable windows 1108 is in the slanted position, both the vertically slidable windows may be positioned towards the top member 1102C. This may allow the side rails 1112A, 1112B to be disengaged from the sliding tracks 1104A, 1104B, and therefore, allow the set of two vertically slidable windows 1108 to rotate about the top member 1102C, and assume the slanted position.

Figure 12:
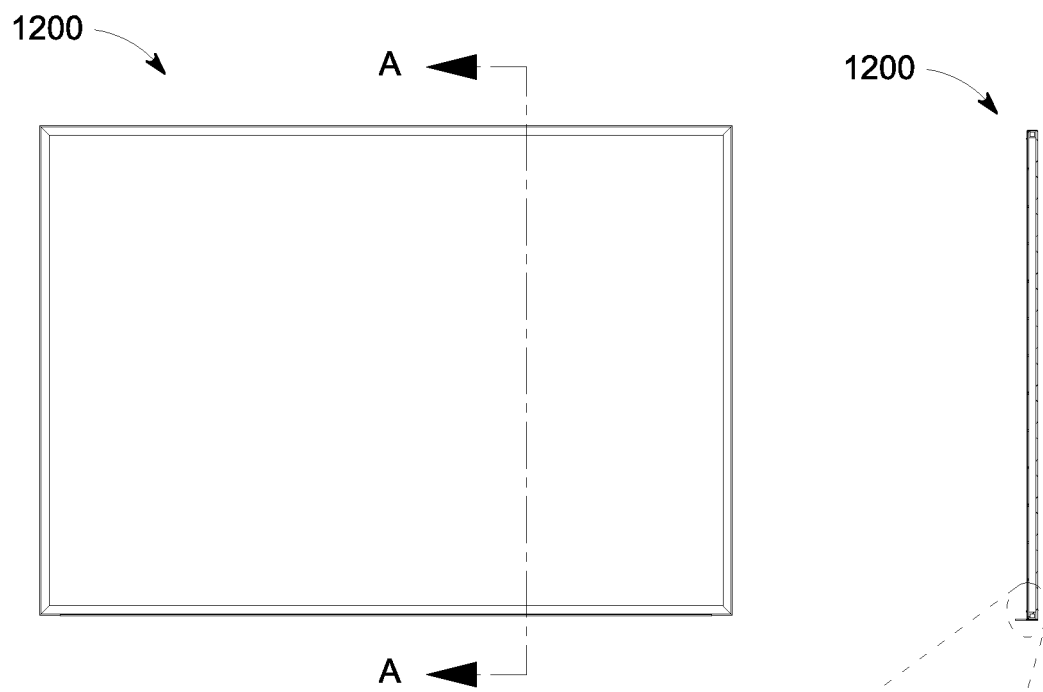
FIG. 12 illustrates a front view of a pane of the set of two vertically slidable windows, in accordance with some embodiments.
Figure 13:
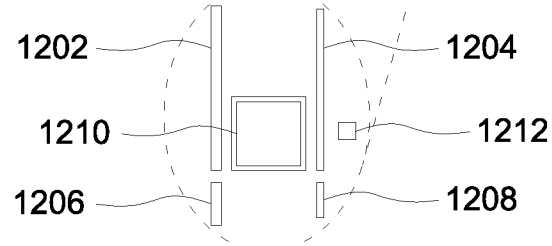
FIG. 13 illustrates a side view of a pane along a section A-A, and a magnified view of a section of the pane, in accordance with some embodiments.
Figure 14:
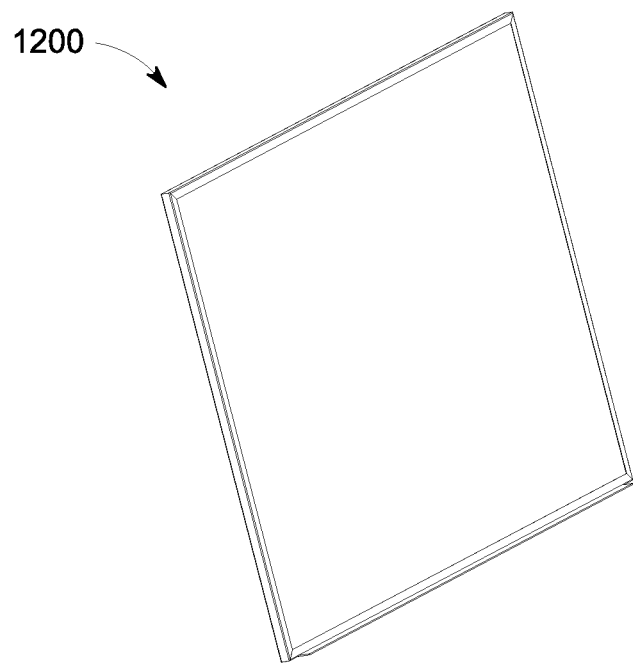
FIG. 14 illustrates a perspective view of the pane of FIG. 13.

With reference to FIG. 12, a front view of a vertically slidable window 1200 of the set of two vertically slidable windows 1108 is illustrated in accordance with some embodiments of the present disclosure. FIG. 13 illustrates a side view of a vertically slidable window vertically slidable window 1200 along a section A-A, and further a magnified view of a section of the vertically slidable window vertically slidable window 1200. FIG. 14 illustrates a perspective view of a vertically slidable window vertically slidable window 1200.

In some embodiments, as illustrated in the FIG. 13, the vertically slidable window 1200 may include an internal screen 1202 and an external screen 1204 separated by a gap. In other words, the vertically slidable window 1200 may have a two-ply structure. The gap may be filled by air or a foam. It may be noted that the gap between the internal screen 1202 and the external screen 1204 may provide for achieving heat insulation and sound insulation. The vertically slidable window 1200 may further include a window-frame 1210. For example, the window-frame 1210 may be a rectangular structure made of a pipe having a square cross section, such that the window-frame 1210 defines the edges of the vertically slidable window 1200. The internal screen 1202 and the external screen 1204 may be arranged along the periphery defined by the window-frame 1210. In some embodiments, the internal screen 1202 and the external screen 1204 may arranged by stretching them over the window-frame 1210. As such, the vertically slidable window 1200 may include a tension off-cut 1206 and a tension off-cut 1208 respective to the internal screen 1202 and the external screen 1204, respectively. In some embodiments, the internal screen 1202 and the external screen 1204 may be attached to the window-frame 1210 using a one or more fasteners 1212, for examples, rivets. As shown in FIG. 14, the vertically slidable window 1200 may further include a projection 1214. For example, the projection 1214 may be provided to allow the vertically slidable window 1200 to be pulled downwards to open close the window vertically slidable window 1200.

In particular, a process of assembling a window may be performed. The process may include providing a frame (i.e., window-frame 1210) defining a perimeter. The frame may include a first planar surface and a second planar surface that is parallel to and offset from the first planar surface. A sheet (e.g., the internal screen) defining a perimeter may be provided. The perimeter of the sheet may coordinate with the perimeter of the frame. Then, the sheet may be contacted to the first planar surface of the frame. The sheet may be tensioned along the perimeter of the sheet, and after the tensioning, the sheet may be attached to the frame.

Additionally, after the tensioning and before the attaching, at least one of the sheet and the frame may be match-drilled. After the match-drilling, the sheet may be attached to the frame with a plurality of fasteners. The plurality of fasteners may include a rivet and an anvil coaxial to the rivet. The attaching may include moving the anvil relative to the rivet.

The process may further include providing a second sheet (e.g., the external screen 1204), contacting the second sheet to the second planar surface of the frame, and attaching the second sheet to the frame.

Figure 15:
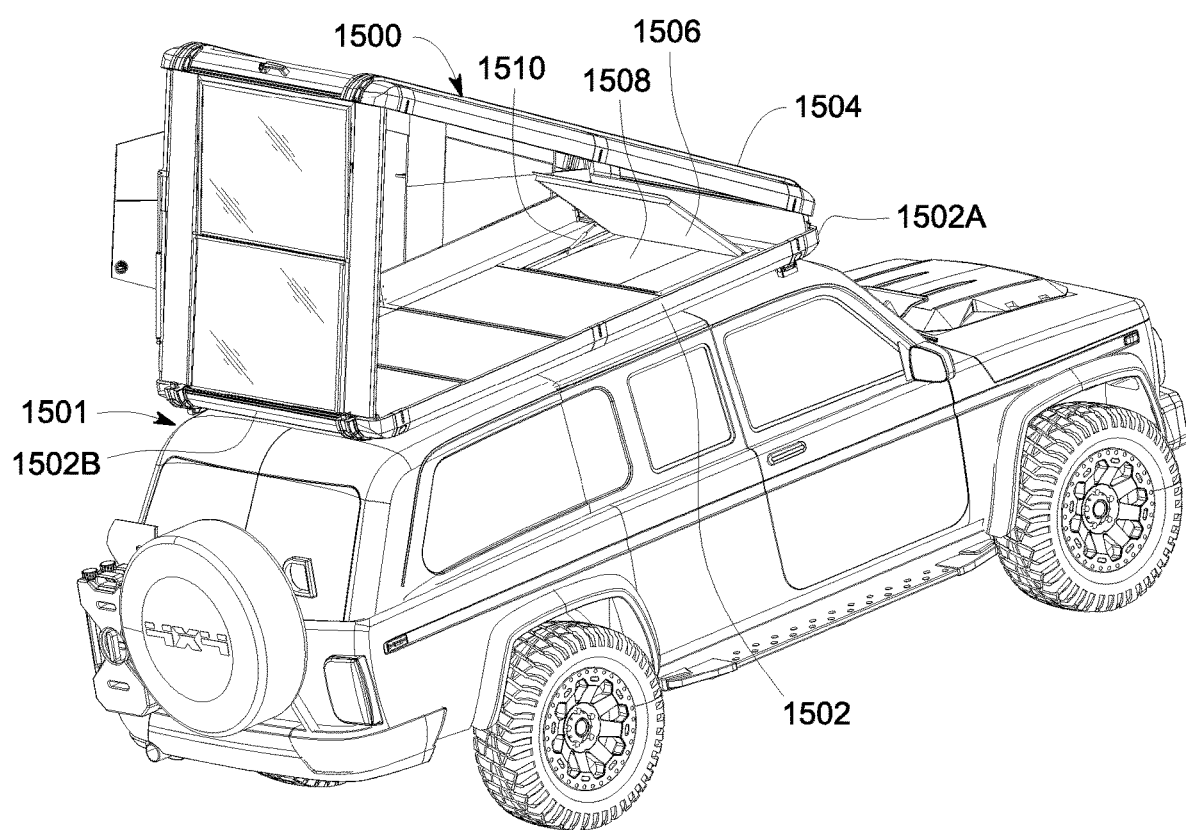
FIG. 15 illustrates a front view of a collapsible shelter system in its open position, fitted on the rooftop of a vehicle, in accordance with some embodiments of the present disclosure.

With reference to FIG. 15, a front view of a collapsible shelter system 1500 (corresponding to the collapsible shelter system 104) in its open position, fitted on the rooftop of a vehicle 1501 is illustrated in accordance with some embodiments of the present disclosure. In some embodiments, base 1502 of the collapsible shelter system 1500 may include a passthrough which may be operable to slide or operable using one or more hinges and at least one gas strut. The passthrough may include a cut-out 1508 formed in the base 1502 and a passthrough window 1506 coupled to the base 1502. The passthrough may allow a rider inside the vehicle to access or move into the collapsible shelter system 1500, in coordination with the sunroof of the vehicle. As such, the passthrough provides the advantage of accessing or moving into the collapsible shelter system 1500 without the rider having to come out of the vehicle. The position of the passthrough may therefore be aligned with the position of the sunroof of the vehicle. In other words, during mounting, the collapsible shelter system 1500 may be positioned on the rooftop of the vehicle in such a manner that the passthrough is aligned with the sunroof of the vehicle. It may therefore be preferable that the passthrough is positioned near the front edge 1502A of the base 1502.

In some embodiments, the passthrough window 1506 may be slidable relative to the cut-out 1508. To this end, the base 1502 may include one or more tracks to enable the sliding movement of the passthrough window 1506. For example, in order to open the passthrough, the passthrough window 1506 may be slidably moved towards the back edge 1502B. Further, to close the passthrough, the passthrough window 1506 may be slidably moved towards the front edge 1502A.

In alternate embodiments, as shown in the FIG. 15, the passthrough window 1506 may be hingedly attached to the base 1502. For example, the passthrough window 1506 may be attached to the base 1502 near one of the edges of the cut-out 1508 via a hinge. It may be noted that this edge of the cut-out 1508 may be the one towards the front edge 1502A of the base 1502. Therefore, the passthrough window 1506 may rotate about the hinge to open or close. Further, in some embodiments, the passthrough window 1506 may be coupled to the base 1502 via one or more gas struts 1510. It may be noted that the one or more gas struts 1510 may be hydraulic or pneumatic piston-cylinder assemblies. These gas struts 1510 may cause to temporarily hold the passthrough window 1506 in the open or closed position. As such, in order to move the passthrough window 1506 between the open and closed position, manual effort may be required to overcome the effect of the gas struts 1510.

In alternative embodiments, the collapsible shelter system 104 and the vehicle may be relatively sealed together wherein the passthrough and the roof of the vehicle are sealed together by a collapsible seal (e.g. foam, an air bladder, an according flexible material, or the like). In one configuration, a foam donut-shaped seal is positioned around the sunroof of the vehicle prior to the placement of the collapsible shelter system 104 onto the vehicle. This donut-shaped seal surrounds the passthrough and the sunroof to block external air from entering into the interior space of the shelter and/or the vehicle.

It may be further noted that a mattress may be configured to be positioned on the base 1502. Therefore, in order to allow access via the passthrough, the mattress (not shown in the FIG. 15) may be made foldable to make way for the passthrough window. Or, the mattress may be a two part mattress, such that one part of the mattress can be removed in order to access the passthrough.

Figure 16:
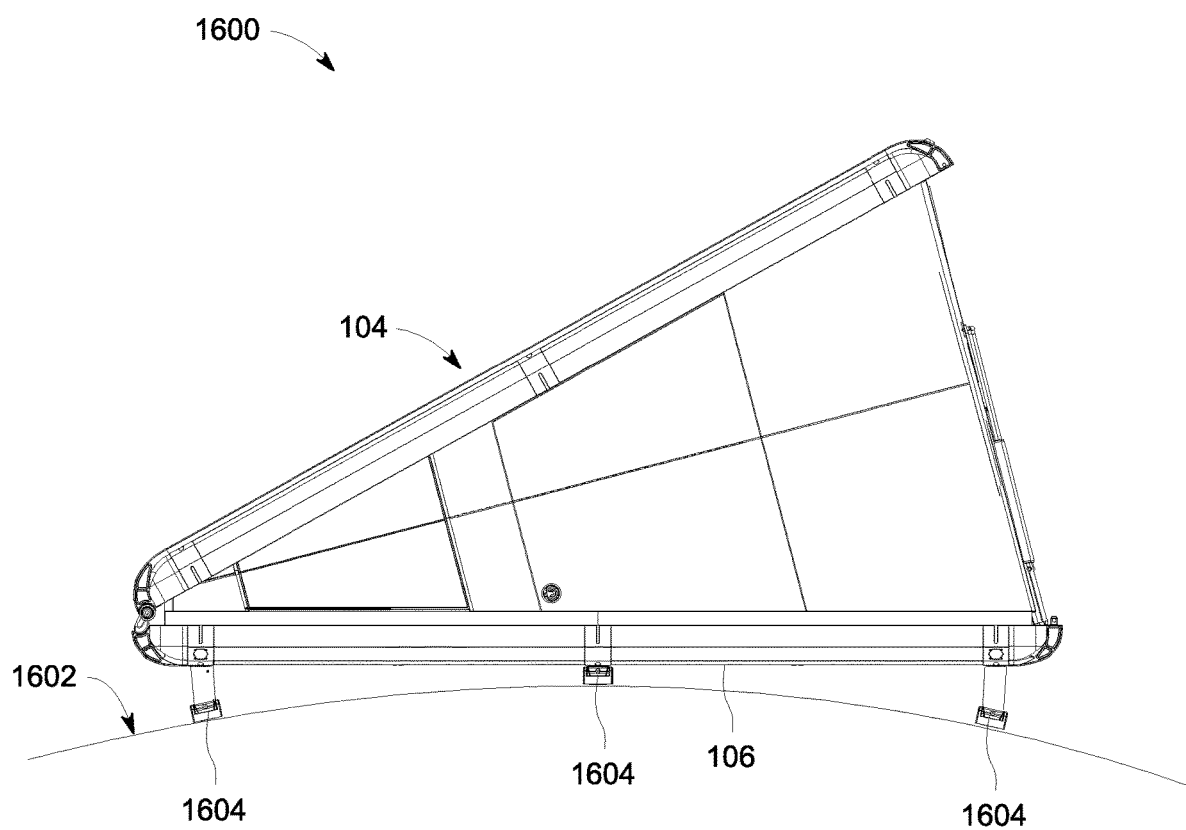
FIG. 16 illustrates a side view of the collapsible shelter system fitted on the rooftop of a vehicle, in accordance with some embodiments.

With reference to FIG. 16, a side view 1600 of the collapsible shelter system 104 fitted on the rooftop 1602 of a vehicle is illustrated, in accordance with an embodiment of the present disclosure. As shown in the FIG. 16, the collapsible shelter system 104 may be fitted on the rooftop 1602 using a plurality of adjustable mounts 1604. The plurality of adjustable mounts 1604 may be configured for securing the base panel 106 to a rooftop 1602 of the vehicle. As it will be understood, the rooftop 1602 of the vehicle may not be exactly planar, and may include some amount of curvature. As such, the base 106 (which may be substantially planar) of the collapsible shelter system 104 may not align with the curvature of the rooftop. At the tangent of the apex of the arc of the vehicle rooftop 1602, the base 106 of the collapsible shelter system 104 may be parallel, however, and at other points the base 106 may appears to be proportionally positioned as to appear to be parallel. Due to the above factors, fitting the collapsible shelter system 104 on the rooftop 1602 may be challenging, especially when the mounts 1604 are of same and of fixed shape and size. The adjustable mount 1604 may allow the collapsible shelter system 104 to be mounted on the rooftop 1602 of the vehicle, when the base 106 (collapsible shelter system 104) is substantially planar to the rooftop of the vehicle, independent of a contour of the rooftop 1602 of the vehicle. In particular, the collapsible shelter system 104 is nominally parallel to the rooftop of the vehicle, independent of a contour of the rooftop of the vehicle.

Figure 17A:
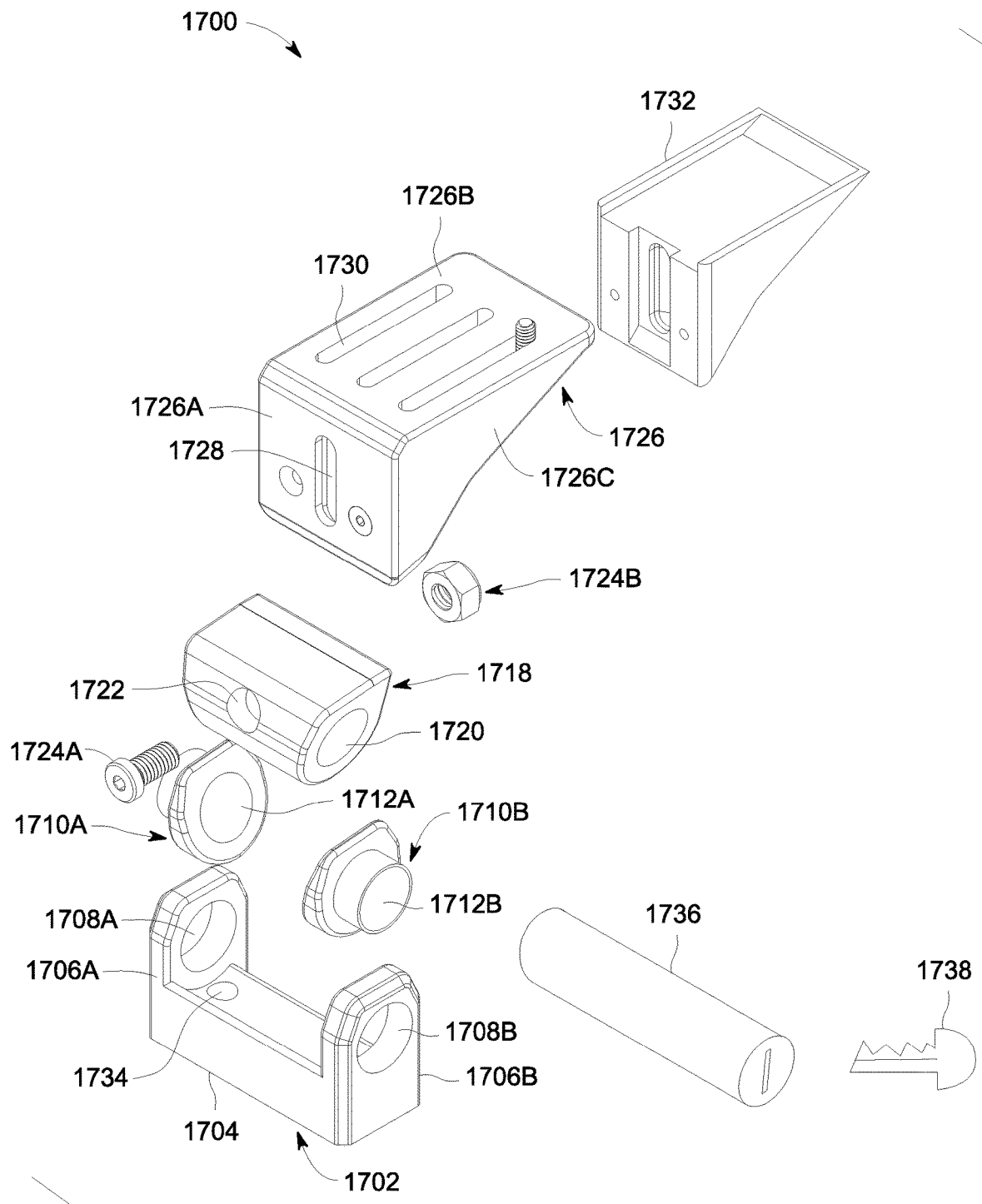
FIG. 17A illustrates an exploded view of an unassembled adjustable mount, in accordance with some embodiments.
Figure 17B:
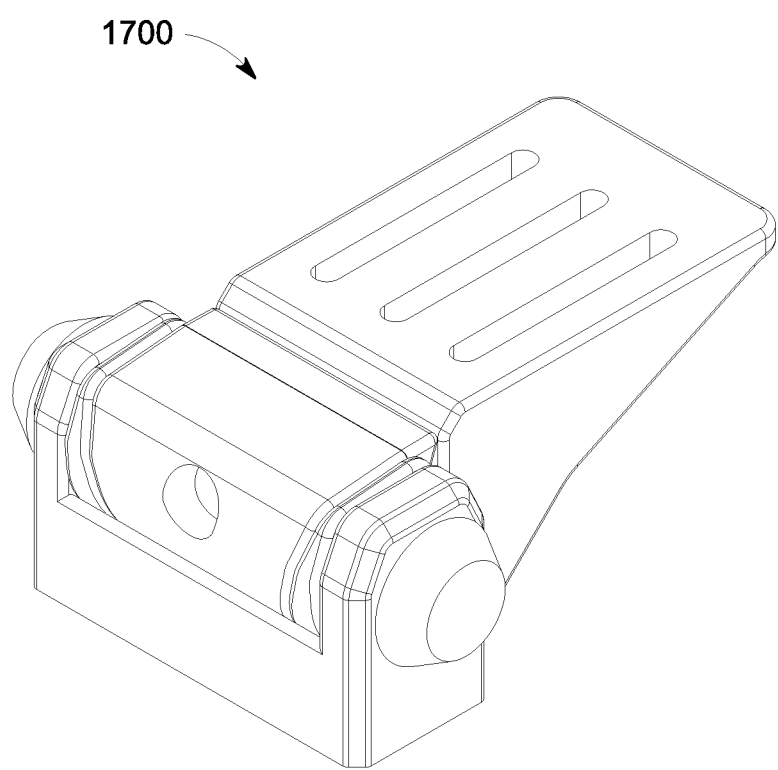
FIG. 17B illustrates a perspective view of an assembled adjustable mount, in accordance with some embodiments.

With reference to FIG. 17A, an exploded view of an unassembled adjustable mount 1700 (corresponding to the adjustable mount 1604) is illustrated, in accordance with an embodiment of the present disclosure. FIG. 17B shows a perspective view of an assembled adjustable mount 1700. FIG. 18 shows another exploded view of an unassembled adjustable mount 1700. FIG. 19 shows a side view of the assembled adjustable mount 1700. FIG. 20 shows a front view of the assembled adjustable mount 1700. The adjustable mount 1700 may include a base 1702, a pair of bushings 1710A, 1710B (also, collectively referred to as bushings 1710), a clamp 1718, a fastener 1724, and a bracket 1726. Additionally, the adjustable mount 1700 may include a bracket cover 1732. Further additionally, the adjustable mount 1700 may include a locking pin 1736. It may be noted that base 1702, the pair of bushings 1710A, 1710B the clamp 1718, the bracket 1726, and the bracket cover 1732 may be made from a rigid material like a polymer, a metal, an alloy, etc. In some embodiments, the base 1702, the clamp 1718, and the bracket 1726 are made of aluminum (preferably anodized), the pair of bushings 1710A, 1710B are made of nylon, and the bracket cover 1732 is made of plastic.

The base 1702 may be a rigid component with a U-shaped configuration and having a horizontal portion 1704 and a pair of arms 1706A, 1706B projected vertically upwards and positioned along the extreme edges of the horizontal portion 1704. Each of the pair of arms 1706A, 1706B has a hole, i.e., the arm 1706A has a hole a 1708A and the arm 1706B has a hole 1708B. Further, the hole 1708A may be aligned with the hole 1708B, i.e., the centers of the holes 1708A, 1708B may be aligned along a common axis. Furthermore, the diameter of the holes 1708A, 1708B may be same. The base 1702 may be formed as a single piece or it may be an assembly of the horizontal portion 1704 and the pair of arms 1706A, 1706B.

Each of the pair of bushings 1710A, 1710B has a wedge portion and a cylindrical portion, i.e., the bushing 1710A has a wedge portion 1714A and a cylindrical portion 1716A, and the bushing 1710B has a wedge portion 1714B and a cylindrical portion 1716B. As shown in the FIG. 18, each of the wedge portions 1714A, 1714B may be thicker at bottom and thinner at the top (i.e., tapering towards the top). Further, the cylindrical portion of each of the bushings 1710A, 1710B may be configured to fit into the holes 1708A, 1708B. In other words, the cylindrical portions 1716A, 1716B of each of the bushings 1710A, 1710B may be configured to fit into the holes 1708A, 1708B. In other words, the cylindrical portion 1716A of the bushing 1710A may be configured to fit into the hole 1708A of the arm 1706A of the base 1702. Further, the cylindrical portion 1716B of the bushing 1710B may be configured to fit into the hole 1708B of the arm 1706B of the base 1702. It may be noted that each of the bushings 1710A, 1710B may be free to rotate inside the holes 1708A, 1708B, owing to the circular cross section of the cylindrical portions 1716A, 1716B and the circular shape of the holes 1708A, 1708B. Further, each of the pair of bushings 1710A, 1710B (i.e., the wedge portions 1714A, 1714B and the cylindrical portions 1716A, 1716B) may be hollow. In other words, the each of the pair of bushings 1710A, 1710B may include a hole, i.e., the bushing 1710A may have a hole 1712A and the bushing 1710B may have a hole 1712B. Each of the holes 1712A, 1712B may be aligned with the holes 1708A, 1708B, i.e., the centers of the holes 1712A, 1712B, 1708A, 1708B may be configured to align along a common axis.

The clamp 1718 is configured to fit between the wedge portions 1714A, 1714B of the bushings 1710A, 1710B. As such, the clamp 1718 has side walls tapering towards the bottom and matching the taper of the wedge portions 1714A, 1714B of the bushings 1710A, 1710B. Further, the clamp 1718 may be hollow from within, i.e., the clamp may have a longitudinal hole 1720 formed along the length of the clamp 1718. The longitudinal hole 1720 may be configured to align with each of the holes 1712A, 1712B, 1708A, 1708B.

Further, the clamp 1718 may have a lateral hole 1722 extending through the width of the clamp 1718. This lateral hole 1722 may be aligned perpendicular to the longitudinal hole 1720. The lateral hole 1722 may be configured to allow for fastening the clamp 1718 with the bracket 1726 using a fastener 1724. For example, the fastener 1724 may include an assembly of a bolt 1724A and a nut 1724B. As such, the lateral hole may not be of uniform size, and the size of the lateral hole 1722 on the rear side may be greater than the size of the lateral hole 1722 on the front side. This may allow of the threaded bolt 1724A (along with the head of the bolt 1724A) to pass through the rear side of the lateral hole 1722. However, the front side of the lateral hole 1722 may allow only the thread and shank of the bolt 1724A to pass through but may block the head of the bolt 1724A. Therefore, the bolt 1724A along with the nut 1724B may be used to fasten the clamp 1718 with the bracket 1726.

The bracket 1726 may have a front face 1726A, a top face 1726B, a first side face 1726C, and a second side face 1726D. The front face 1726A may have a groove 1728 oriented vertically. The groove 1728 may allow to fasten the bracket 1726 with the clamp 1718 using the fastener 1724. The groove 1728 may further allow height adjustment by the variable vertical positioning of the bracket 1726 relative to the clamp 1718. Further, the bracket 1726 pivots about the fastener 1724, and therefore is free to rotate the about the fastener 1724, to thereby attain multiple variable angular orientations relative to the clamp 1718.

The adjustable mount 1700 may further include a locking pin 1736 which may be operable using a key 1738. The locking pin 1736 may be cylindrical in shape having a circular cross section, and configured to slide into the holes 1712A, 1712B, 1708A, 1708B, 1720. The locking pin 1736 may be further configured to be positioned within the holes 1712A, 1712B, 1708A, 1708B, 1720 and locked in that position using they key 1738. To this end, the locking pin 1736 may include one or more engaging members (e.g., threads) which may cause to lock the locking pin 1736 with at least one of the base 1702, the bushings 1710, or the clamp 1718.

It may be noted that the clamp 1718 pivots about the locking pin 1736, and as such, may be free to rotate to some degrees about the locking pin 1736. This allows the clamp 1718 and therefore the bracket to rotate to some degrees relative to the base 1702, and assume various angular orientations relative to the base 1702 and therefore the rooftop 1602.

It may be further noted that once the locking pin 1736 is locked, the locking pin 1736 may prevent access through the lateral hole 1722, and therefore prevent an illicit attempt to unfasten the bracket 1726 from the clamp 1718 by manipulating the fastener 1724. However, whenever it is desired to access the fastener 1724, the locking pin 1736 may be unlocked using the key 1738 to remove the latch from the holes 1712A, 1712B, 1708A, 1708B, 1720, to thereby allow access to the fastener 1724.

The top face 1726B may have one or more slots 1730. The collapsible shelter system 104 may be fitted to the adjustable mount 1700 using one or more fasteners (e.g., bolts, nut-bolt assemblies, screws, etc.) through the one or more slots 1730. The slots may allow the length adjustments for the collapsible shelter system 104 by allowing for variable positioning of the fasteners in the one or more slots 1730.

Thus, the adjustable mount 1700 can be reconfigured in multiple different configurations based by different orientations of the clamp 1718 relative to the base 1702, different vertical positionings and angular orientations of the bracket 1726 relative to the clamp. As such, when a number of mounts 1700 are mounted on the rooftop of the vehicle, by setting the different mounts in different configurations, the top faces of the multiple mounts may be aligned in single plane, i.e., at same height and angular orientations. This, therefore, allows the planar base 106 of the collapsible shelter system to be placed on the multiple mounts, thereby overcoming the curvature of the rooftop 1602.

In some embodiments, the adjustable mount 1700 may further include a bracket cover 1732. The bracket cover 1732 may be configured to be fitted within the bracket 1726, once the bracket is fastened to the clamp 1718 in the desired configuration. The bracket cover 1732 may provide for covering and therefore hiding the nut 1724B and the fasteners passing through the one more slots 1730. This ensures safety of the bracket 1726. As it will be understood, by covering the nut 1724B and the fasteners passing through the one more slots 1730, the bracket cover 1732 may help in preventing an illicit action of dismantling the collapsible shelter system 104 from the vehicle rooftop 1602.

It may be noted that in order to fit the adjustable mount 1700 on the rooftop 1602, the adjustable mount 1700 may include one or more mounting holes 1734. For example, each adjustable mount 1700 may include two mounting holes 1734. The adjustable mount 1700 may therefore be fitted to the rooftop 1602 by fastening the adjustable mount 1700 using fasteners (not shown in FIG. 17) via the one or more mounting holes 1734.

Furthermore, the adjustable mount 1700 may be fitted on a track positioned on the rooftop 1602 of the vehicle, using the fasteners. As such, the adjustable mount 1700 may be transitioned along the track for refitting, by loosening the fasteners, repositioning the mount on the track and then re-fastening the adjustable mount 1700 on the track (as shown in FIG. 19). In some embodiments, six mounts 1700 may be used to fasten the collapsible shelter system 104 to the rooftop 1602.

Figure 21:
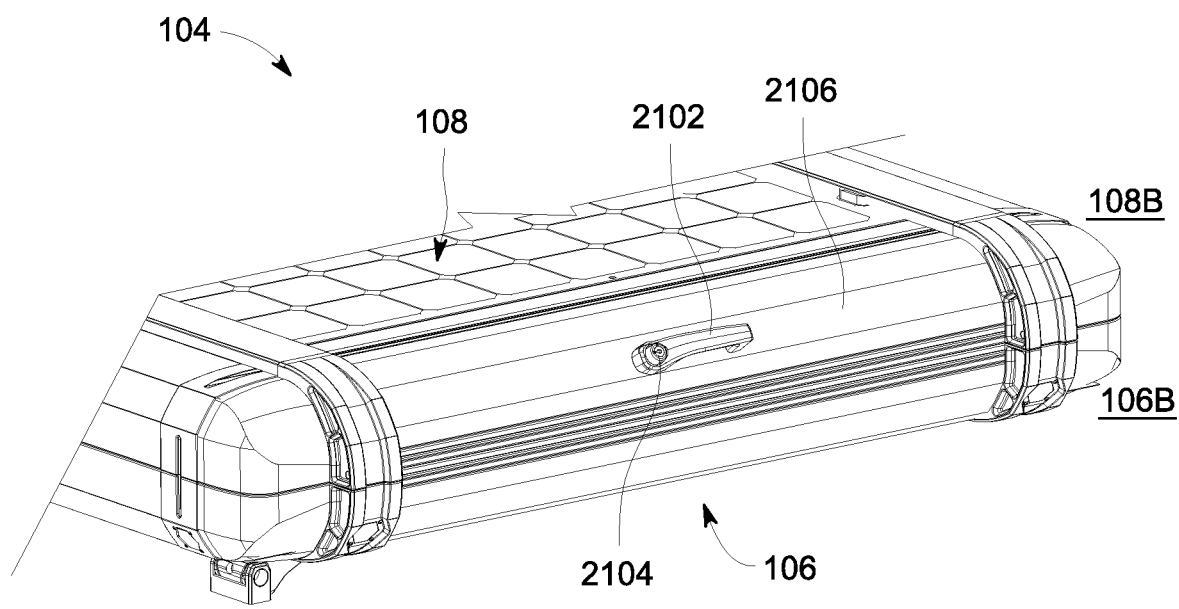
FIG. 21 illustrates a perspective view of a segment of the collapsible shelter system including a handle, in accordance with some embodiments.

With reference to FIG. 21, a perspective view of a segment of the collapsible shelter system 104 including a handle 2102 is illustrated, in accordance with some embodiments of the present disclosure. The handle 2102 may be provided on the roof 108 of the collapsible shelter system 104 to allow the roof 108 to be manually lifted upwards or pushed downwards so as to reconfigure the collapsible shelter system 104 between the open position and the closed position. As such, the handle 2102 may be provided on the back edge 108B of the roof 108. In particular, the handle 2102 may be provided on a wall 2106 projecting outwards from the plane of the roof 108. Additionally, the handle 2102 may include a latch 2104 which may be provided in the handle 2102 itself. The latch 2104 may include a key hole that may be operated using a key. The latch 2104 may allow a user to lock the roof 108 with the base 106 in order to lock the collapsible shelter system 104 in the closed position. The handle 2102 may be made of a rigid material like a metal, an alloy, a polymer, etc.

Figure 22:
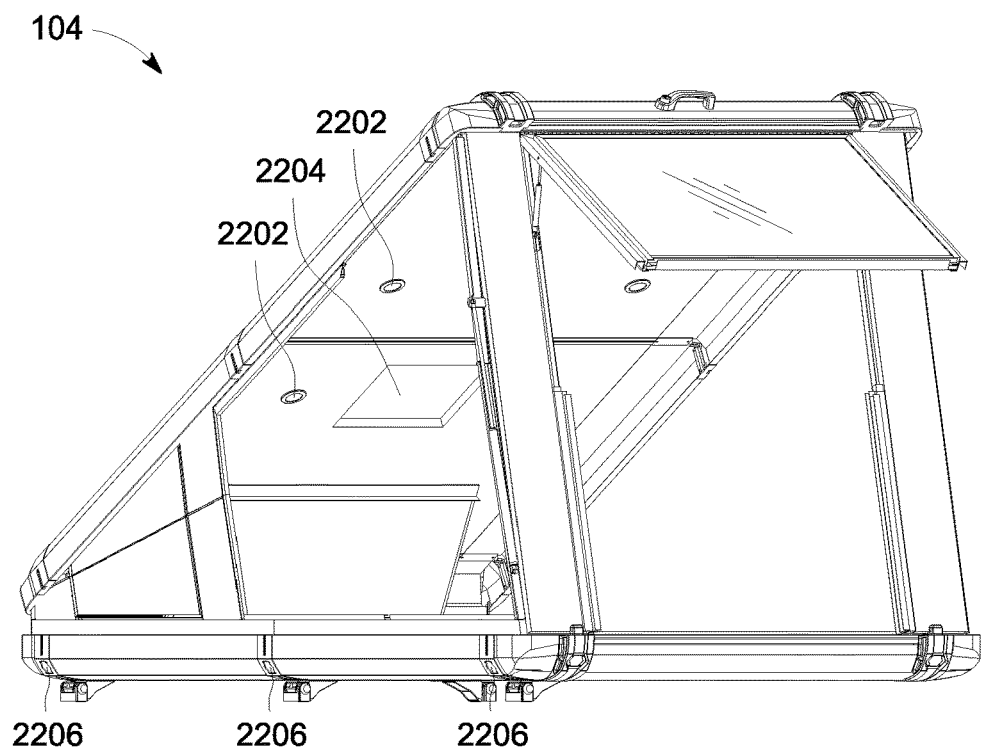
FIGS. 22-23 illustrates different perspective views of the collapsible shelter system, in accordance with some embodiments.
Figure 23:
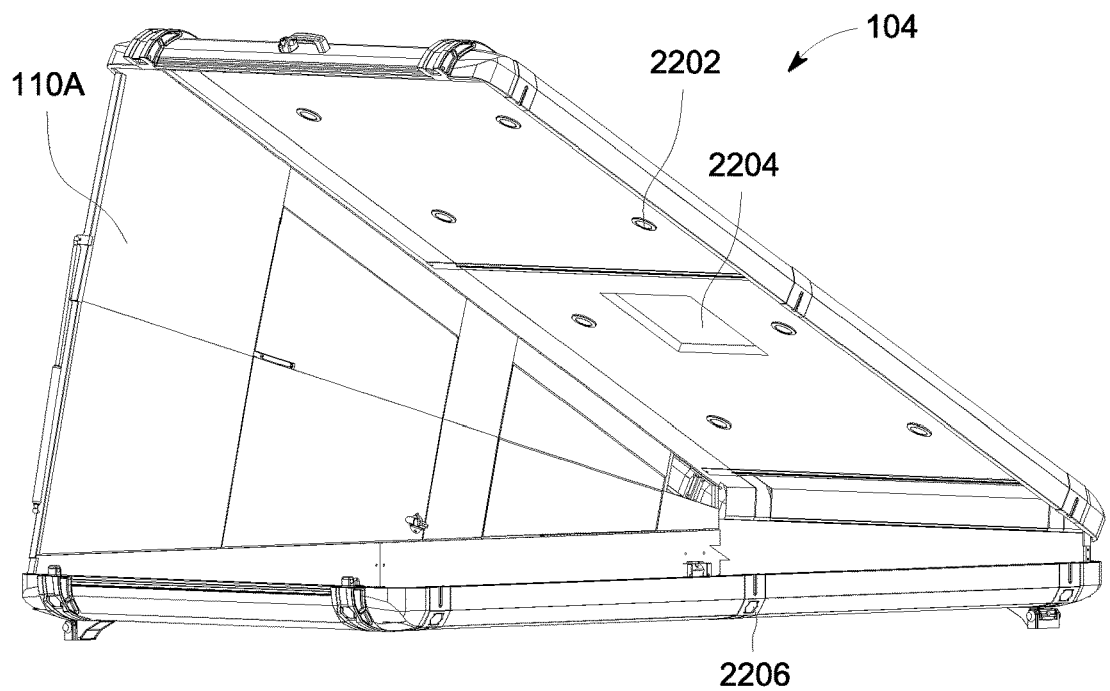
Figure 24:
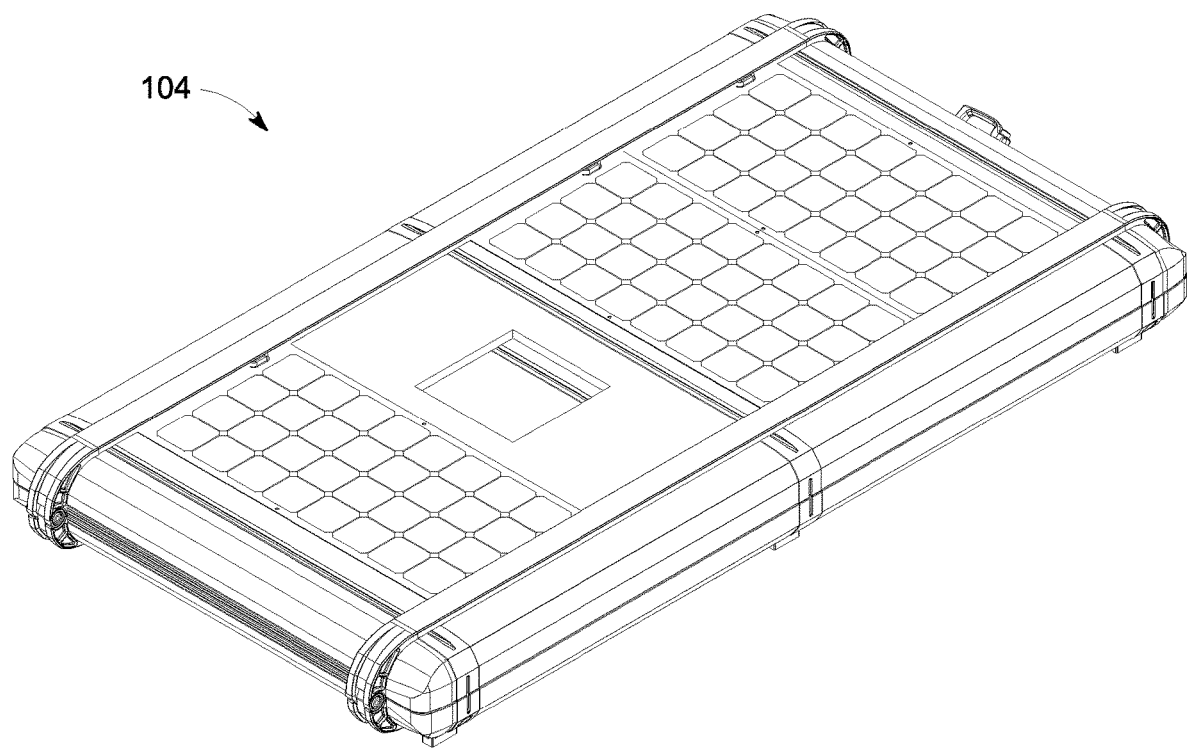
FIGS. 24-30 illustrate different views (i.e., a perspective view, a left side view, a right side view, a top view, a bottom view, a front view, and a rear view, respectively) of an ornamental design of the collapsible shelter system in the closed position, in accordance with some embodiments.
Figure 25:
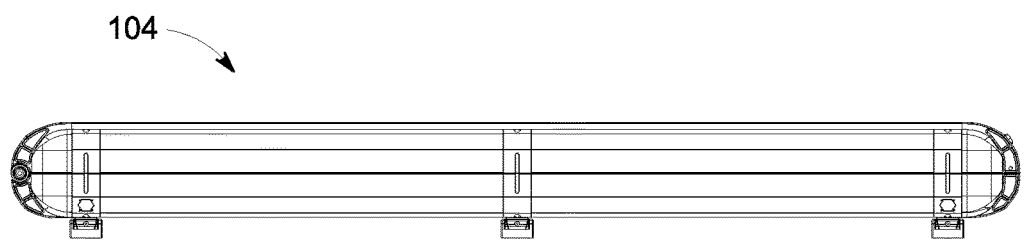
Figure 26:
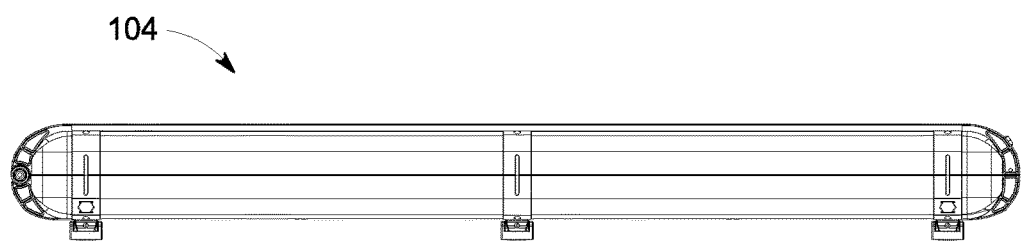
Figure 27:
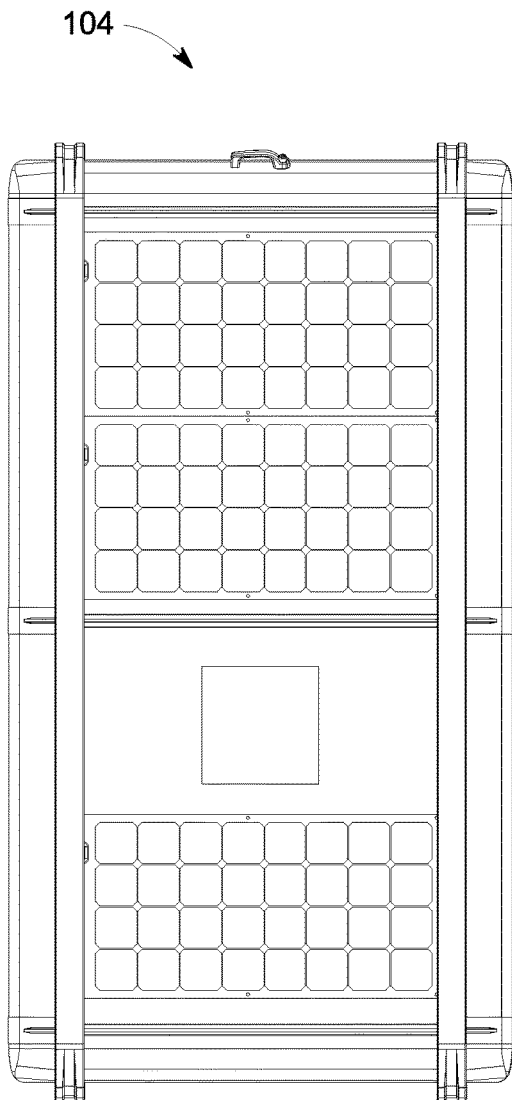
Figure 28:
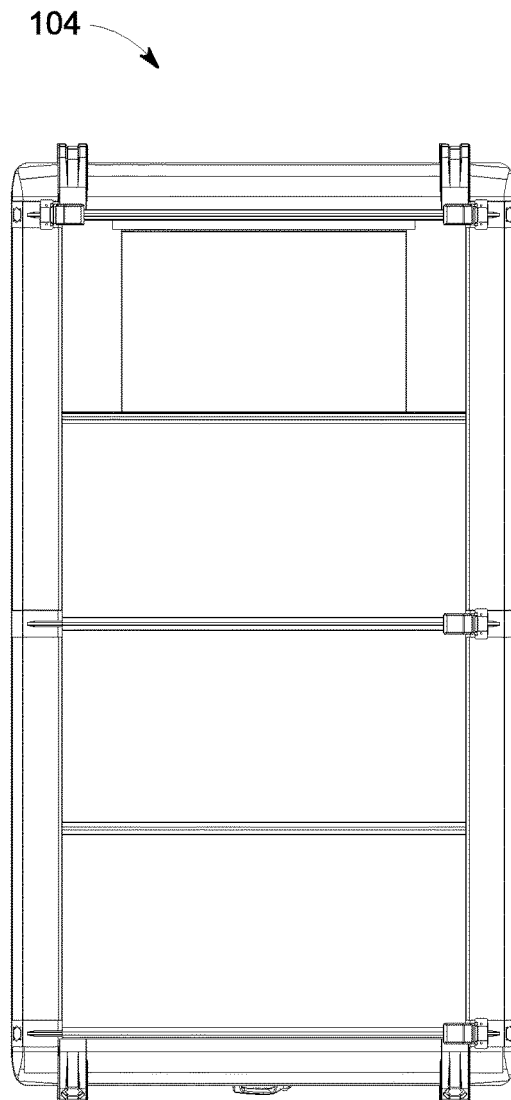
Figure 29:
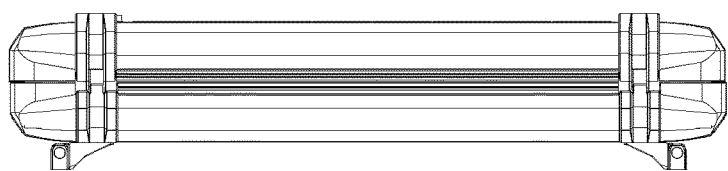
Figure 30:
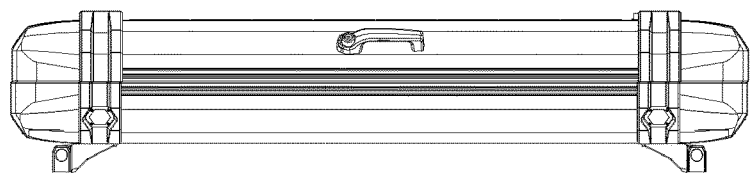
Figure 31:
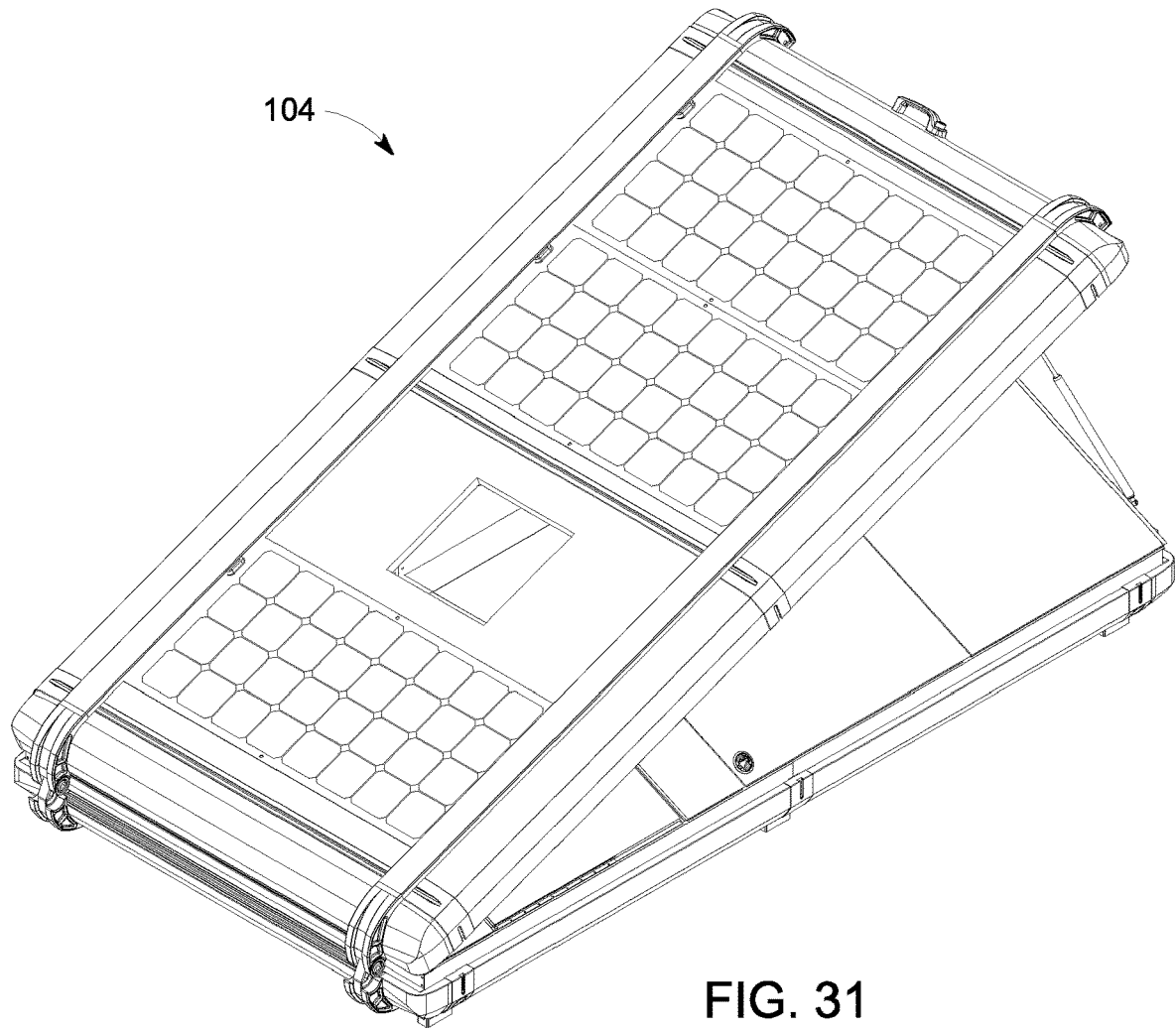
FIGS. 31-35 illustrate different views (i.e., a perspective view, a left side view, a right side view, a top view, and a bottom view, respectively) of an ornamental design of the collapsible shelter system in the intermediate position, in accordance with some embodiments.
Figure 32:
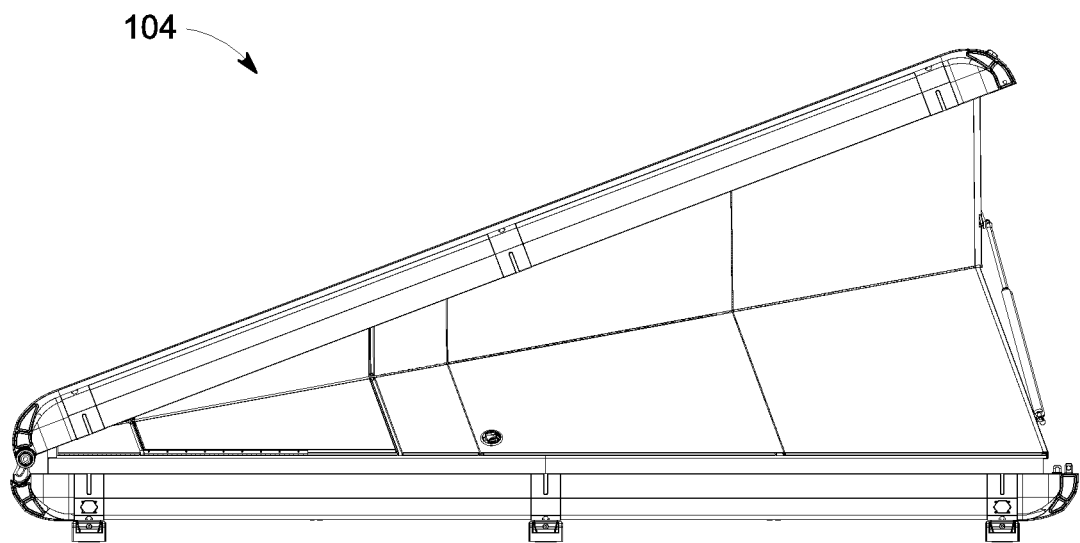
Figure 33:
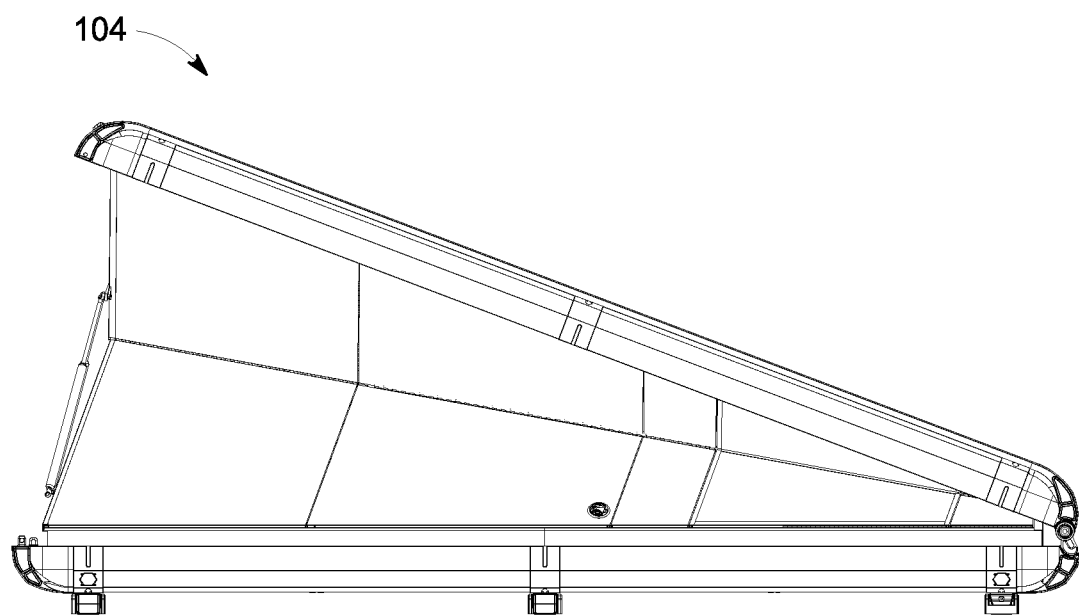
Figure 34:
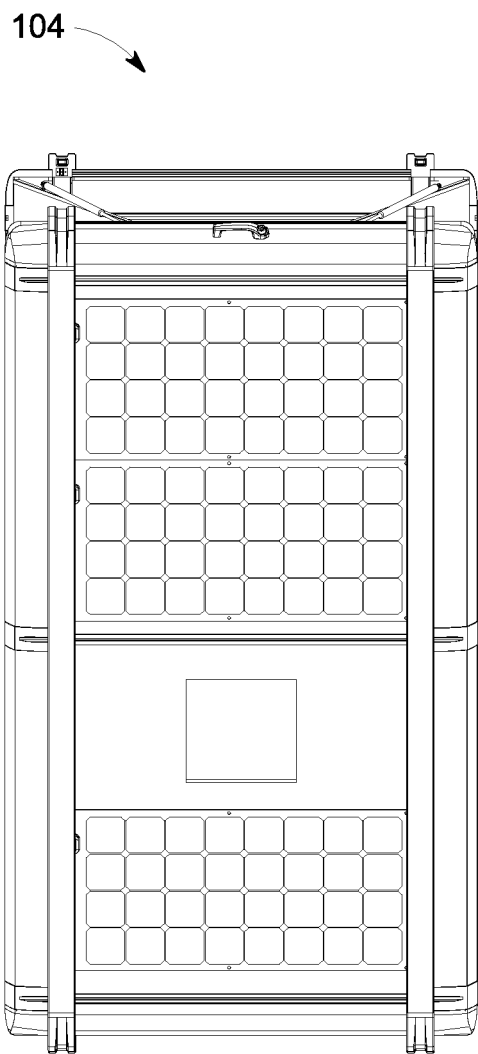
Figure 35:
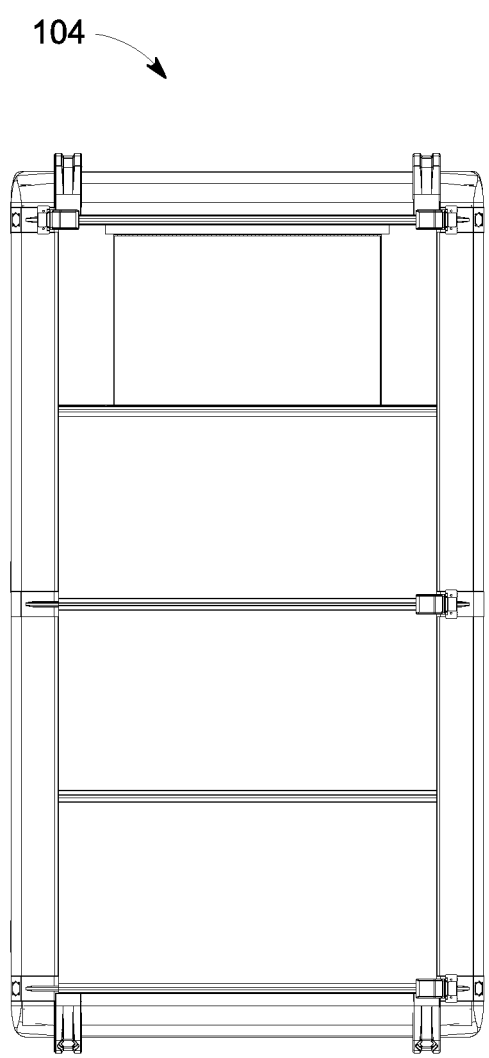
Figure 36:
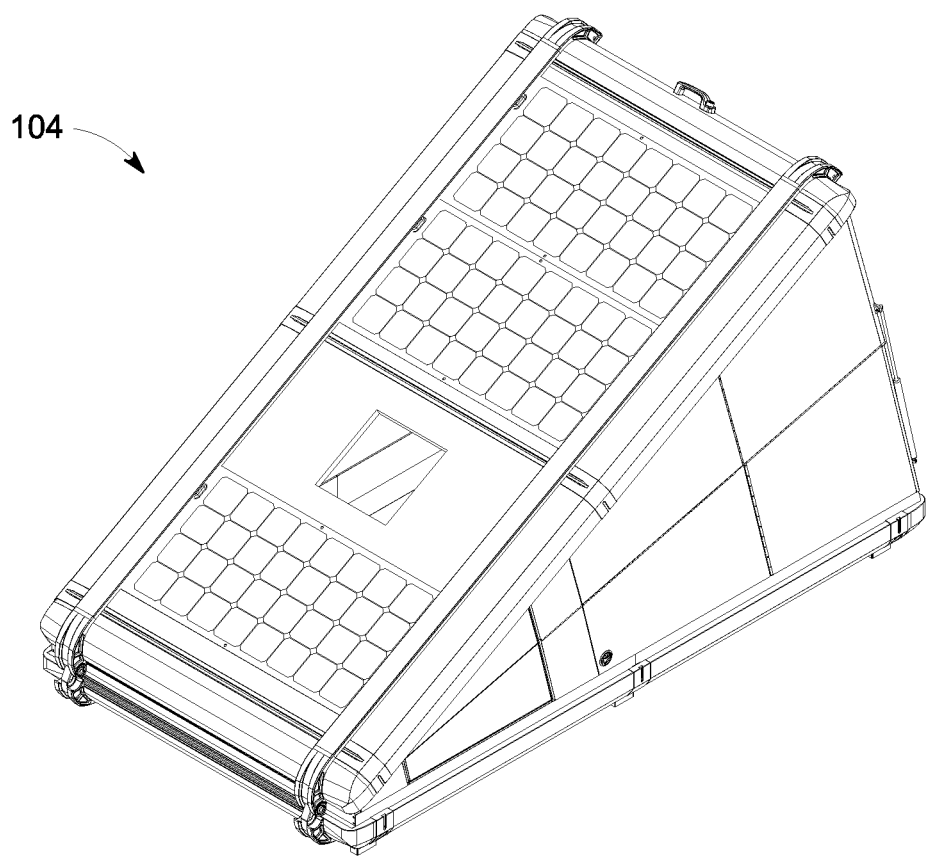
FIGS. 36-42 illustrate different views (a perspective view, a left side view, a right side view, a top view, a bottom view, a front view, and a rear view, respectively) of an ornamental design of the collapsible shelter system in the open position, in accordance with some embodiments.
Figure 37:
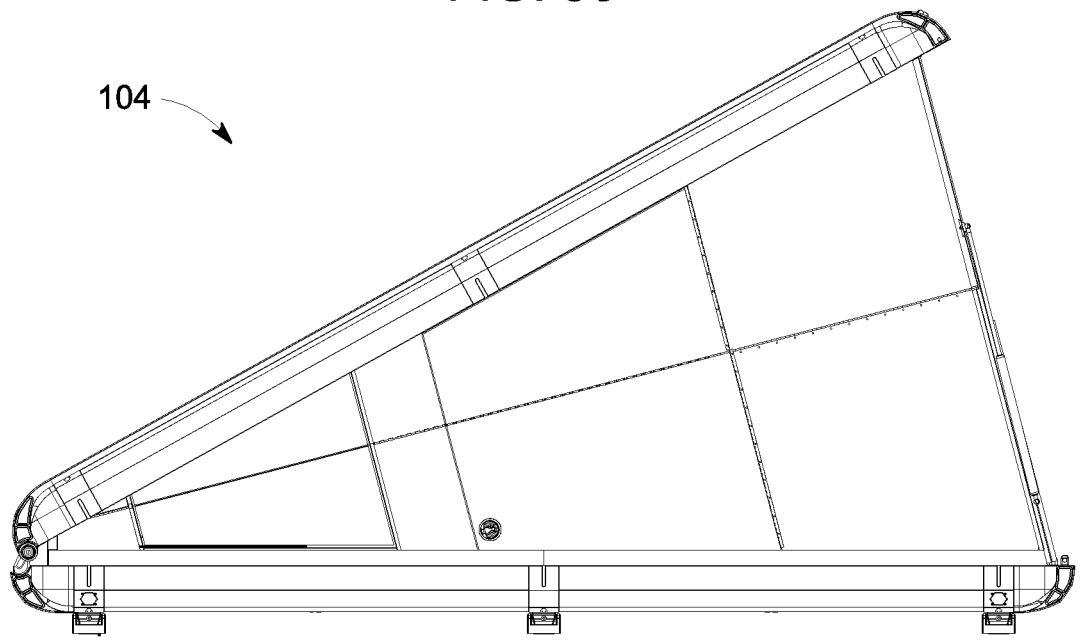
Figure 38:
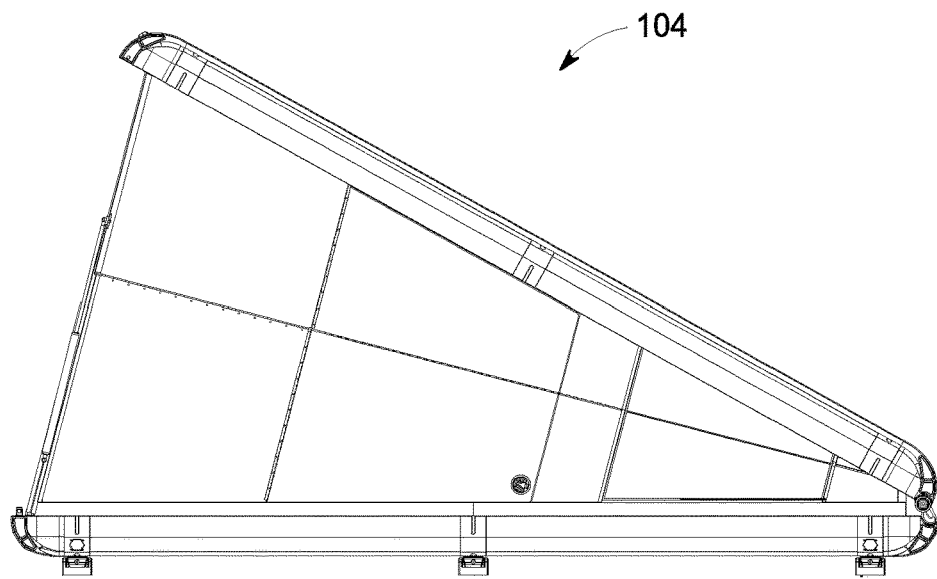
Figure 39:
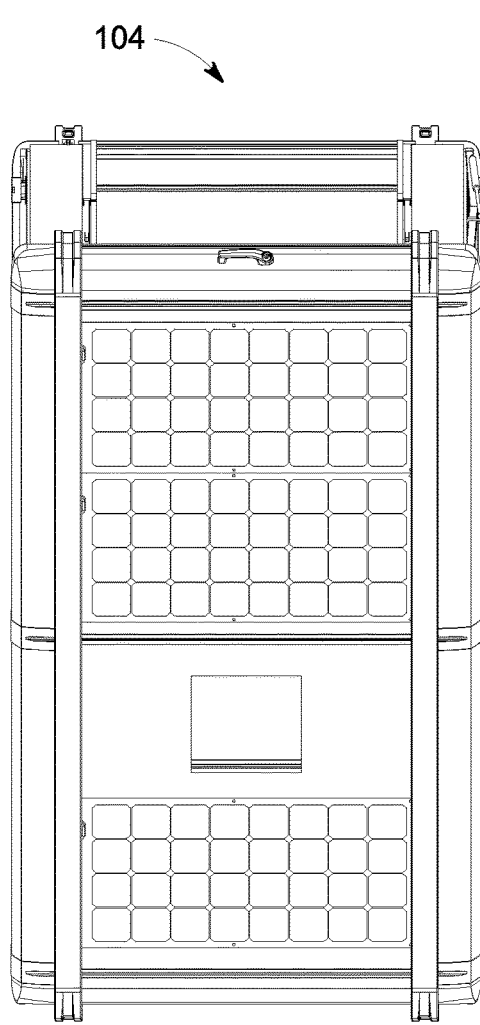
Figure 40:
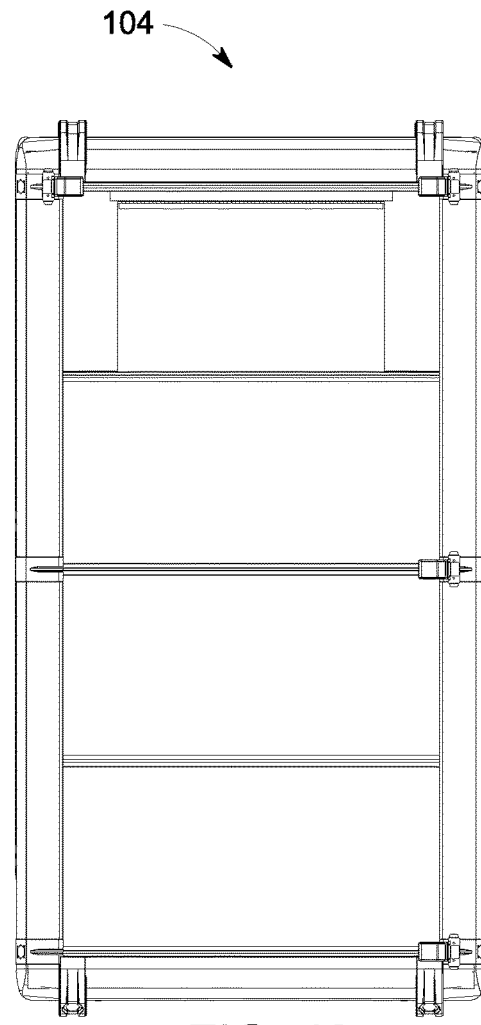
Figure 41:
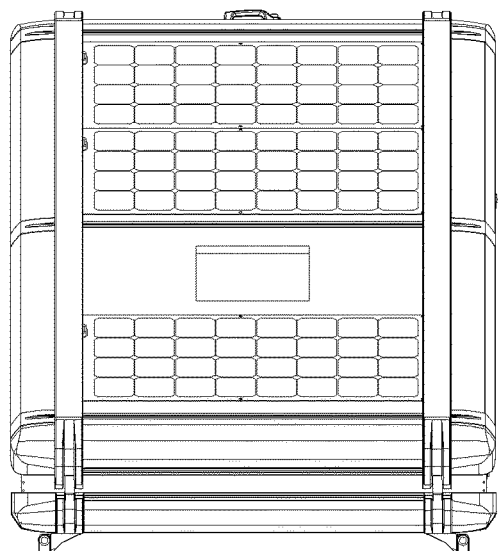
Figure 42:
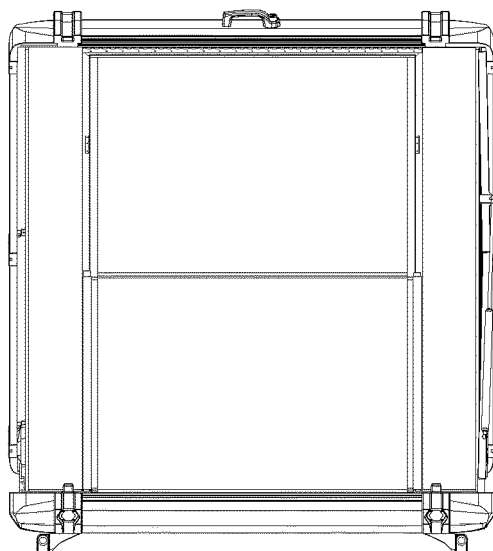

Referring now to FIGS. 22-23, two different perspective views of the collapsible shelter system 104 are illustrated, in accordance with some embodiments of the present disclosure. In some embodiments, the collapsible shelter system 104 may include one or more internal illumination sources 2202, to provide illumination inside the collapsible shelter system 104. These one or more internal illumination sources 2202 may be mounted on the inside of roof 108. Additionally or alternately, the one or more internal illumination sources 2202 may be provided on the inside surface of the first side wall 110A and/or the second side wall 110B (not shown in the FIG).

Further, in some embodiments, the collapsible shelter system 104 may include one or more external illumination sources 2206, to provide illumination outside the collapsible shelter system 104. These one or more external illumination sources 2206 may be mounted on the outside surface of the base 106, as shown in the FIG. 23. Additionally or alternately, the one or more external illumination sources 2206 may be provided on any section of the collapsible shelter system 104.

It may be noted that each of the internal illumination sources 2202 and the external illumination sources 2206 may be operable using one or more switches. As such, one or more switch buttons may be provided on the collapsible shelter system 104 to switch ON or OFF the internal illumination sources 2202 and the external illumination sources. Further, each of the internal illumination sources 2202 and the external illumination sources 2206 may be dimmable, i.e., configured to provide light of varying intensity. Additionally, the switching ON/OFF or the intensity of illumination may be controlled using remote controls or via internet connectivity.

In some embodiments, the collapsible shelter system 104 may further include a fan (not shown in the FIGS. 22-23). The fan may be configured to be positioned in on the region 2204. The fan (i.e., the region 2204) may be positioned anywhere on the inner surface of the roof 108, based on the space which may require the most aeration. The fan may be configured to run at varying speeds to allow the user to operate the fan at a desired speed as per the comfort. To this end, one or more switch buttons may be provided inside the collapsible shelter system 104. Additionally, the switching ON/OFF or the speed of the fan may be controlled using remote controls or via internet connectivity.

The internal illumination sources 2202, the external illumination sources 2206, and fan may be powered by a battery (not shown in the FIGS. 22-23). The battery may be charged by one or more solar panels which may be positioned on an outside (top) surface of the roof 108. For example, a set of solar panels may be integrated on the outside surface of the roof 108. Further, a rechargeable battery may be included which may be configured to be charge by electricity generated by the set of solar panels. Alternately, the internal illumination sources 2202, the external illumination sources 2206, and the fan may be powered by the vehicle. As such, the internal illumination sources 2202, the external illumination sources 2206, and the fan may be coupled to a power source available inside the inside compartment using wired connections.

Figure 43:
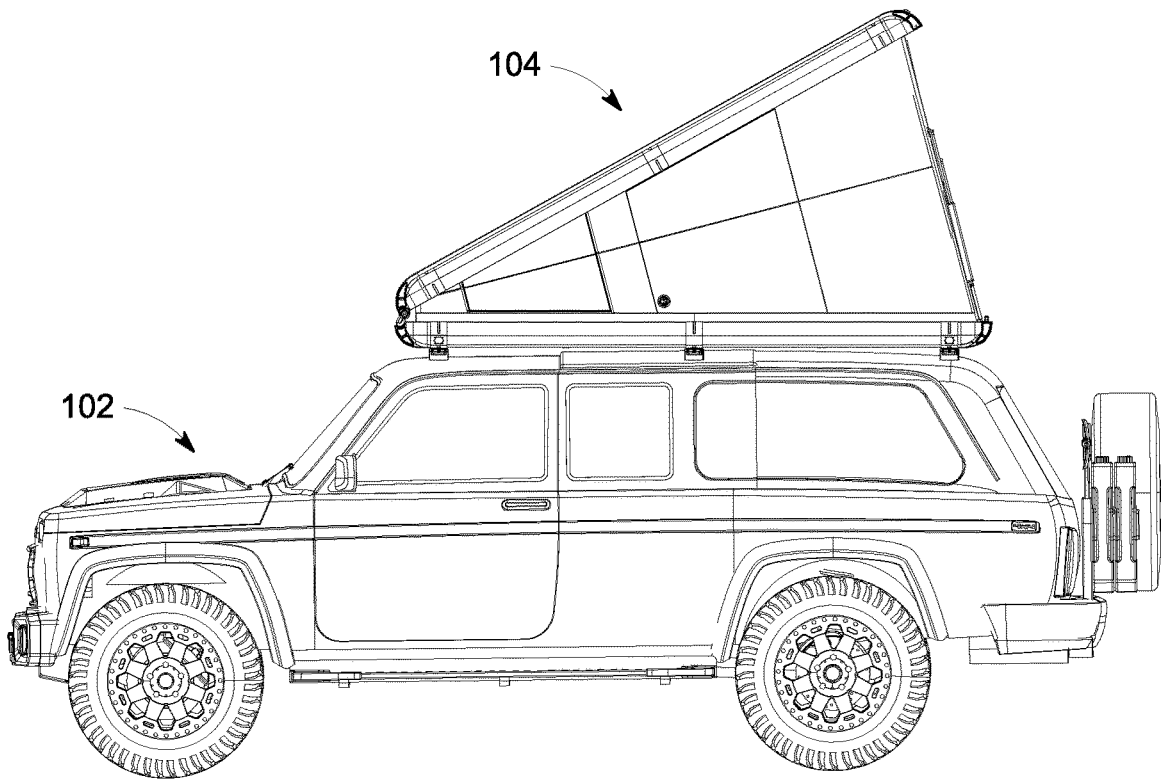
FIG. 43 illustrates a side view of the collapsible shelter system in the open position and mounted on the rooftop of a vehicle, in accordance with some embodiments.

With reference to FIGS. 24-30, a perspective view, a left side view, a right side view, a top view, a bottom view, a front view, and a rear view, respectively of an ornamental design of the collapsible shelter system in the closed position, is illustrated in accordance with some embodiments of the present disclosure. Further, with reference to FIGS. 31-35, a perspective view, a left side view, a right side view, a top view, and a bottom view, respectively of an ornamental design of the collapsible shelter system in intermediary position is illustrated, in accordance with some embodiments of the present disclosure. Moreover, with reference to FIGS. 36-42 illustrate a perspective view, a left side view, a right side view, a top view, a bottom view, a front view, and a rear view, respectively of an ornamental design of the collapsible shelter system in open position is illustrated, in accordance with some embodiments of the present disclosure. FIG. 43 illustrates a side view of the collapsible shelter system in open position, fitted on the rooftop of a vehicle, in accordance with some embodiments of the present disclosure.

Referring now to FIG. 44, a flowchart of a method 4400 of assembling a collapsible shelter system 104 is illustrated, in accordance with some embodiments of the present disclosure. At step 4402, a base 106 and a roof 108 of the collapsible shelter system 104 may be provided. Each of the base 106 and the roof 108 may be defined by a front edge, a back edge, a first side edge, and a second side edge. In particular, the base 106 may be defined by a front edge 106A, a back edge 106B, a first side edge 106C, and a second side edge 106D. The roof 108 may be defined by a front edge 108A, a back edge 108B, a first side edge 108C, and a second side edge 108D.

At step 4404, a first side wall 110A and a second side wall 110B may be provided. Each of the first side wall 110A and a second side wall 110B may be defined by an inside surface and an outside surface oppositely disposed from the inside surface. Further, each of the first side wall 110A and a second side wall 110B may include a lower portion and an upper portion. In particular, the first side wall 110A may include a lower portion 112A and an upper portion 114A. The second side wall 110B may include a lower portion 112B and an upper portion 114B.

At step 4406, the roof 108 may be hingedly attached to the base 106 along the front edge 106A, 108A, using one or more translating hinge assemblies 202. The one or more translating hinge assemblies 202 may provide for translational movement and for rotational movement of the roof 108 with respect to the base 106. At step 4408, the lower portions 112A, 112B of the first side wall 110A and the second side wall 110B may be hingedly attached to the base 106 along the first side edge 106C and the second side edge 106D, respectively. At step 4410, the upper portions 114A, 114B of the first side wall 110A and the second side wall 110B may be hingedly attached to the roof 108 along the first side edge 108C and the second side edge 108D, respectively. At step 4412, the lower portions 112A, 112B of the first side wall 110A and the second side wall 110B may be hingedly attached to respective upper portions 114A, 114B of the first side wall 110A and the second side wall 110B along a middle-hinge axis 116.

Additionally, the lower portion 112A and the upper portion 114A of the first side wall 110A may be coupled with a first gas strut 115A. Further, the lower portion 112B and the upper portion 114B of the second side wall 110B may be coupled with a second gas strut 115B.

At least one of a door 912 and a window 918 may be provided in at least one of the first side wall 110A and the second side wall 110B. The door 912 may be provided near the back edge 902B, and the window 918 may be provided near the front edge 902A.

A mattress 712 may be configured for supporting a human. Further, an ingress guard 706 may be provided within the base 702. The ingress guard 706 may run along an inside perimeter of the base 702 and may define a space to hold the mattress 712 disposed within the base 702.

A back wall 1002 may be provided that may define an inside surface and an outside surface oppositely disposed from the inside surface. The back wall 1002 may be hingedly attached to the base 106 along the back edge 106B of the base 106. It may be noted that in the closed position, the inside surface of the back wall 1002 may be facing the base 106, and the outside surface of the back wall 1002 may be is facing the lower portions 112A, 112B of the inside surface of the first side wall 110A and the second side wall 110B. Further, in the open position, the back wall 1002 may be is couplable to the roof 108 along the back edge 108B of the roof 108.

Further, in the closed position, each of the first side wall 110A and the second side wall 110B may be folded about the middle-hinge axis 116. The upper portions 114A, 1104B of the inside surface of the first side wall 110A and the second side wall 110B may be facing the roof 108. The lower portions 112A, 112B of the inside surface of the first side wall 110A and the second side wall 110b may be facing the base 106. The upper portions 114A, 114B of the outside surface of the first side wall 110A and the second side wall 110B may be facing the respective lower portions 112A, 112B of the outside surface of the first side wall 110A and the second side wall 110B. The middle-hinge axis of the first side wall 110A may align with the middle-hinge axis of the second side wall 110B. Further, in an open position, each of the first side wall 110A and the second side wall 110B may be perpendicular to the base 106 and to the roof 108. The roof 108 may be non-parallel to the base 106. A back height defined by the distance between the back edge 106B of the base 106 and the back edge 108B of the roof 108 is greater than a front height defined by the distance between the front edge 106A of the base 106 and the front edge 108A of the roof 108. The middle-hinge axis of the first side wall 110A may be parallel to the middle-hinge axis of the second side wall 110B.

A set of solar panels and a rechargeable battery may be provided. The rechargeable battery may be configured to be charged by electricity generated by the set of solar panels. Further, the set of solar panels may be installed on an outside surface of the roof 108. Furthermore, the rechargeable battery may be electrically coupled to the set of solar panels.

Referring to FIG. 45, a method 4500 of installing a collapsible shelter system 104 on a rooftop of a vehicle 102 is illustrated, in accordance with an embodiment of the present disclosure.

At step 4502, a plurality of adjustable mounts 1700 may be secured to the rooftop of the vehicle 102. At step 4504, the plurality of adjustable mounts 1700 may be adjusted to create a plane nominally parallel to the rooftop of the vehicle 102 and independent of a contour of the rooftop of the vehicle 102. As used herein, the phrase 'nominally parallel' may mean that at the tangent of the apex of the arc of the vehicle roof the base 106 is parallel, and at other points the base 106 appears to be proportionally positioned as to appear to be parallel.

At step 4506, a base 106 of the collapsible shelter system 104 may be secured onto the plurality of adjustable mounts 1700, to thereby position and secure the collapsible shelter system 104 onto the rooftop of the vehicle 102, via the plurality of adjustable mounts 1700.

With reference to FIG. 46, a method 4600 of assembling a window is disclosed, in accordance with an embodiment of the present disclosure. At step 4602, a frame defining a perimeter may be provided. The frame may include a first planar surface, and a second planar surface that is parallel to and offset from the first planar surface. At step 4604, a sheet defining a perimeter may be provided. The perimeter of the sheet may coordinate with the perimeter of the frame.

At step 4606, the sheet may be contacted to the first planar surface of the frame. At step 4608, the sheet may be tensioned along the perimeter of the sheet. At step 4610, after the tensioning, the sheet may be attached to the frame.

Additionally, the method 4600 may include match-drilling, after the tensioning and before the attaching, at least one of the sheet and the frame. After the match-drilling, attaching the sheet to the frame with a plurality of fasteners. the plurality of fasteners may include a rivet and an anvil coaxial to the rivet. The attaching may include moving the anvil relative to the rivet.

The method 4600 may further include providing a second sheet, contacting the second sheet to the second planar surface of the frame, and attaching the second sheet to the frame.

In one alternative embodiment not shown, the ornamental appearance of the present collapsible shelter system may be altered by removing various features and/or components. For example, the solar panels or the fan may be deleted to give a slightly narrower appearance. The present disclosure includes the narrowest embodiments. This narrowest disclosure does not limit applicant's ability to claim broader embodiments in this or future applications. For example, at some point in the future, a US Design Patent application may be filed that only claims the basic shape of the collapsible shelter system and specifically excludes features of the solar panel(s), the fan, the lights, the handle, the mounts and the vehicle; some of the additional limiting features may be incorporated as environmental (illustrated by phantom lines) or excluded.

In one exemplary implementation, dimensions of the collapsible shelter system 104 may be about 90"×56"×10" (about 14" high at fan dome) in the closed position, and about 90"×56"×60" with about 82"×53"×57" of living space at its highest point in the open position. In the above mentioned implementation, the weight of the collapsible shelter system 104 may be about 190 pounds. In another exemplary implementation, dimensions of the collapsible shelter system 104 may be about 110"×60"×10" (14" high at fan dome) in the closed position, and about 110"×60"×65.5" with about 101"×57"×62" of living space at its highest point in the open position. In the above mentioned implementation, the weight of the collapsible shelter system 104 may be about 250 pounds.

As stated above, the collapsible shelter system 104 may be shaped from insulated carbon fiber composite, from the roof to the floor to the corners and end panels. In an exemplary implementation, the collapsible shelter system 104 may be outfitted with billet aluminum side brackets that can hold awnings or shovels, for example. In an implementation, the hinges and other hardware may be made from stainless steel. In an exemplary implementation, the collapsible shelter system 104 may support three crossbars, that may be employed for mounting bike racks, ski racks, MAXTRAX, RotopaX containers, or other things that one might normally stow atop the vehicle. In an exemplary implementation, in the closed position, the collapsible shelter system 104 may remain securely stowed using the built-in keyed locking system.

In an exemplary implementation, the collapsible shelter system 104 may include three-inch foam mattress that is split into two sections. The larger section may fit about a queen-size mattress sheet, while the smaller section may fit about a twin-mattress sheet. The mattress may be split into two sections in order to enable campers to access the tent from the bottom—through their vehicle's sunroof, for example. In an exemplary implementation, the side walls may be upholstered and the headliner may be soft-touch material.

In an exemplary implementation, the interior of the collapsible shelter system 104 may be heated by a diesel heater with automatic altitude adjustment (at about 11,000 feet) with a variable-speed fan. It should be noted that the interior temperature may be further regulated through the heat vents in the ceiling. As stated above, the dual-pane polycarbonate windows feature fixed upper and operable lower portions, allowing ample natural light in. The movable windows may be held in place with a window-stay system. As stated above, that the water may be kept out of the interior by employing the ingress guard. Further, it should be noted that the water may be kept out of the interior by employing waterproof seals and hinges.

In an exemplary implementation, the interior may be illuminated by the integrated dimmable LED interior lighting, which can be set to a white or red light spectrum. Further, in an exemplary implementation, the exterior surrounding may be illuminated by the integrated dimmable exterior LED lighting. As stated above, the lighting power may be provided by an integrated rechargeable battery. In an exemplary implementation, the integrated rechargeable battery may be lithium-ion battery bank of about 40-80 amp hours rating. In an exemplary implementation, the wiring may be robust and durable marine-grade wiring.

In an exemplary implementation, each corner of the collapsible shelter system 104 may be fitted with power sockets (e.g., 110-120 Volt power sockets or 12 Volt power sockets) and/or dual USB-C ports, for recharging mobile devices. As stated above, the interior electrical power itself is sourced from the roof-mounted solar panel array. In an exemplary implementation, the collapsible shelter system 104 may be fitted with about 200-400 Watt solar array. In an exemplary implementation, the onboard battery's charge level may be monitored through a Bluetooth app.

It is intended that the disclosure and examples be considered as exemplary only, with a true scope and spirit of disclosed configurations being indicated by the following claims and amendments made thereto in the original application, divisional applications, continuations application, and/or foreign applications.

What is claimed is:

1. A mount for securing an object on a rooftop of a vehicle, the mount comprising:
    a base attached to either the vehicle or the object, the base comprising:
        a horizontal portion defining a first edge and a second edge oppositely disposed from the first edge; and
        a first arm formed on, and projecting from, the horizontal portion at the first edge, wherein the first arm comprises:
            a first hole formed within the first arm; and
        a second arm formed on, and projecting from, the horizontal portion at the second edge, wherein the second arm comprises:
            a second hole formed within the second arm coaxial to the first hole defining a common axis;
    a clamp attached to the other of the vehicle or the object, the clamp rotationally coupled to the base about the common axis, wherein the clamp comprises:
        a longitudinal hole formed along a length of the clamp;
            wherein upon rotationally coupling of the clamp to the base, the longitudinal hole is configured to align the longitudinal hole of the clamp with the first hole and the second hole of the base along the common axis; and
        a lateral hole extending through a width of the clamp;
            wherein the lateral hole is transverse to the longitudinal hole of the clamp;
        a first fastener disposed in the lateral hole and selectively accessible through the longitudinal hole; and
    a locking pin removably adjoining the first hole, the second hole, and the longitudinal hole;
        wherein the locking pin is configured to inhibit access to the first fastener disposed in the lateral hole of the clamp.

2. The mount of claim 1 and further comprising:
    a bracket configured to be fastened to the clamp using the first fastener via the lateral hole;
        wherein the bracket is configured to pivot about the first fastener to attain multiple variable angular orientations relative to the clamp; and
        wherein the bracket is configured to secure the object using one or more second fasteners.

3. The mount of claim 2, wherein the bracket further comprises:
  a front face comprising:
    a groove oriented vertically;
      wherein the groove is configured to allow fastening of the bracket with the clamp via the first fastener; and
      wherein the groove is further configured to allow height adjustment by a variable vertical positioning of the bracket relative to the clamp;
  a top face, wherein the top face comprises:
    one or more slots;
      wherein the object is configured to be fastened to the mount through the one or more slots, using the one or more second fasteners; and
      wherein the one or more slots are configured to allow length adjustments while securing the object by allowing for variable positioning of the one or more second fasteners in the one or more slots;
  a first side face; and
  a second side face.

4. The mount of claim 3 further comprising:
  a bracket cover;
    wherein the bracket cover is configured to be fitted within the bracket upon fastening of the bracket to the clamp; and
    wherein the bracket cover is further configured to hide a portion of the first fastener and a portion of the one or more second fasteners passing through the one or more slots.

5. The mount of claim 1 and further comprising:
  a pair of bushings comprising:
    a first bushing configured to engage with the first arm, the first bushing comprising:
      a first cylindrical portion configured to fit into the first hole;
      a first wedge portion disposed at one end of the first cylindrical portion; and
      a first bushing hole running across the first wedge portion and the first cylindrical portion; and
    a second bushing configured to engage with the second arm, the second bushing comprising:
      a second cylindrical portion configured to fit into the second hole;
      a second wedge portion disposed at one end of the second cylindrical portion; and
      a second bushing hole running across the second wedge portion and the second cylindrical portion.

6. The mount of claim 5, wherein the clamp comprises:
  a first side wall tapering and matching a taper of the first wedge portion; and
  a second side wall tapering and matching a taper of the second wedge portion;
    wherein the clamp is configured to fit between the first wedge portion of the first bushing and the second wedge portion of the second bushing; and
    wherein upon rotationally coupling of the clamp to the base, the longitudinal hole is further configured to align with the first bushing hole, and the second bushing hole.

7. The mount of claim 1, wherein the first fastener comprises:
  a threaded bolt comprising:
    a shank; and
    a head; and
  a nut.

8. The mount of claim 7, wherein the lateral hole further comprises:
  a rear side defining a first diameter; and
  a front side oppositely disposed from the rear side defining a second diameter that is smaller than the first diameter of the rear side;
    wherein the rear side of the lateral hole is configured to allow passage of the shank and the head of the threaded bolt; and
    wherein the front side of the lateral hole is configured to allow passage of the shank of the threaded bolt and configured to inhibit passage of the head of the threaded bolt.

9. The mount of claim 1,
  wherein the locking pin comprises:
    a cylindrical shape; and
    a circular cross section;
      wherein upon positioning, the locking pin is further configured to be locked in its position using a key; and
  wherein the locking pin further comprises:
    an engaging member configured to engage the locking pin with at least one of the base and the clamp.

10. The mount of claim 1, wherein the horizontal portion of the base comprises:
  at least one hole to fit the mount on the rooftop of the vehicle, using at least one third fastener.

11. A mount for securing an object on a structure, the mount comprising:
  a base attached to either the structure or the object, the base comprising:
    a first arm comprising:
      a first hole formed within the first arm; and
    a second arm comprising:
      a second hole formed within the second arm and coaxial to the first hole defining a common axis;
  a clamp attached to the other of the structure or the object, the clamp rotationally coupled to the base about the common axis, wherein the clamp comprises:
    a longitudinal hole formed along a length of the clamp;
      wherein upon rotationally coupling of the clamp to the base, the longitudinal hole is configured to align with the first hole and the second hole of the base along the common axis; and
    a lateral hole transverse to the longitudinal hole of the clamp;
  a first fastener disposed in the lateral hole and selectively accessible through the longitudinal hole; and
  a locking pin removably adjoining the first hole, the second hole, and the longitudinal hole;
    wherein the locking pin is configured to inhibit access to the first fastener disposed in the lateral hole of the clamp.

12. The mount of claim 11, further comprising:
  a bracket configured to be fastened to the clamp using a first fastener via the lateral hole;
    wherein the bracket is configured to pivot and rotate about the first fastener to attain multiple variable angular orientations relative to the clamp; and
    wherein the bracket is configured to secure the object to the structure using one or more second fasteners;
  wherein the bracket comprises:
    a front face comprising:
      a groove oriented vertically;
        wherein the groove is configured to allow fastening of the bracket with the clamp via the first fastener; and wherein the groove is further configured to allow height adjustment by a variable vertical positioning of the bracket relative to the clamp;
a top face comprising:
one or more slots;
wherein the object is configured to be fastened to the mount through the one or more slots, using the one or more second fasteners; and
wherein the one or more slots are configured to allow length adjustments while securing the object by allowing for variable positioning of the one or more second fasteners in the one or more slots;
a first side face; and
a second side face.

13. The mount of claim 11, wherein the first fastener comprises:
a thread.

14. The mount of claim 12 further comprising:
a bracket cover;
wherein the bracket cover is configured to be fitted within the bracket upon fastening of the bracket to the clamp; and
wherein the bracket cover is further configured to hide a portion of the first fastener and the one or more second fasteners passing through the one or more slots.

15. The mount of claim 11, wherein the locking pin further comprises:
an engaging portion configured to engage the locking pin with at least one of the base or the clamp; and
wherein upon positioning the locking pin, the locking pin is further configured to be locked in its position using a key.

16. The mount of claim 11, wherein the base comprises:
at least one mounting hole to fit the mount on either of the structure or the object using at least one third fastener.

17. A method of securing an object on a rooftop of a vehicle, the method comprising:
attaching a base on either the vehicle or the object, wherein the base comprises:
a first arm comprising:
a first hole formed within the first arm; and
a second arm comprising:
a second hole formed within the second arm coaxial to the first hole defining a common axis;
attaching a clamp to the other of the vehicle or the object, wherein the clamp comprises:
a longitudinal hole formed along a length of the clamp; and
a lateral hole transverse to the longitudinal hole of the clamp;
wherein attaching the clamp to the other of the vehicle or the object comprises:
fastening a bracket to the clamp using a first fastener via the lateral hole;
wherein the bracket is configured to pivot and rotate about the first fastener to attain multiple variable angular orientations relative to the clamp; and
coupling the other of the vehicle and the object to the bracket using one or more second fasteners; and
rotationally coupling the clamp to the base, wherein rotationally coupling the clamp to the base comprises:
aligning the longitudinal hole with the first hole and the second hole; and
positioning a locking pin within the first hole, the second hole, and the longitudinal hole.

18. The method of claim 17, wherein rotationally coupling the clamp to the base comprises:
engaging a first bushing with the first arm, wherein the first bushing comprises:
a first cylindrical portion;
a first wedge portion disposed at one end of the first cylindrical portion; and
a first bushing hole running across the first wedge portion and the first cylindrical portion; and
wherein engaging the first bushing with the first arm comprises:
engaging the first cylindrical portion into the first hole;
engaging a second bushing to the second arm, wherein the second bushing comprises:
a second cylindrical portion; and
a second wedge portion disposed at one end of the second cylindrical portion;
a second bushing hole running across the second wedge portion and the second cylindrical portion;
wherein engaging the second bushing to the second arm comprises:
engaging the second cylindrical portion into the second hole;
fitting the clamp between the first wedge portion of the first bushing and the second wedge portion of the second bushing, wherein the clamp further comprises:
a first side wall tapering towards the base and matching a first taper of the first wedge portion;
a second side wall tapering towards the base and matching a second taper of the second wedge portion;
wherein rotationally coupling the clamp to the base further comprises:
aligning the longitudinal hole with the first bushing hole and the second bushing hole.

19. The method of claim 17, wherein the bracket comprises:
a front face comprising:
a groove oriented vertically;
a top face comprising:
one or more slots;
a first side face; and
a second side face;
wherein fastening the bracket to the clamp comprises:
positioning the first fastener through the groove and into the lateral hole;
adjusting height of the bracket by a variable vertical positioning of the bracket relative to the clamp via the groove; and
upon adjusting the height, tightening the first fastener into the lateral hole to fasten the bracket with the clamp; and
wherein fastening the object to the rooftop further comprises:
positioning one or more second fasteners through the one or more slots;
engaging the one or more second fasteners with the object;
adjusting for length of the object by variable positioning of the one or more second fasteners in the one or more slots; and
upon adjusting the length, tightening the one or more second fasteners through the one or more slots to fasten the object to the rooftop.

20. The method of claim 17 further comprising:
upon fastening of the bracket to the clamp and fastening the object to the rooftop, sliding and fitting a bracket cover within the bracket;
  wherein the bracket cover is configured to hide the first fastener and the one or more second fasteners passing through the one or more slots.

21. A method of installing an object on a rooftop of a vehicle, the method comprising:
providing a first mount, wherein the first mount comprises:
  a base attached to either the rooftop of the vehicle or the object, wherein either of the object and the rooftop of the vehicle defines a non-planar profile, the base comprising:
    a first arm comprising:
      a first hole formed within the first arm; and
    a second arm comprising:
      a second hole formed within the second arm coaxial to the first hole defining a common axis;
  a clamp attached to the other of the vehicle or the object, the clamp rotationally coupled to the base about the common axis, wherein the clamp comprises:
    a longitudinal hole formed along a length of the clamp;
      wherein upon rotationally coupling of the clamp to the base, the longitudinal hole is configured to align with the first hole and the second hole of the base along the common axis; and
    a lateral hole transverse to the longitudinal hole of the clamp;
  a first fastener disposed in the lateral hole and selectively accessible through the longitudinal hole; and
  a locking pin removably adjoining the first hole, the second hole, and the longitudinal hole; and
    wherein the locking pin is configured to inhibit access to the first fastener disposed in the lateral hole of the clamp;
providing a second mount, wherein the second mount comprises:
  a base attached to either to the rooftop of the vehicle or the object, the base comprising:
    a first arm comprising:
      a first hole formed within the first arm; and
    a second arm comprising:
      a second hole formed within the second arm coaxial to the first hole defining a common axis;
  a clamp attached to the other of the vehicle or the object, the clamp rotationally coupled to the base about the common axis, wherein the clamp comprises:
    a longitudinal hole formed along a length of the clamp;
      wherein upon rotationally coupling of the clamp to the base, the longitudinal hole is configured to align the longitudinal hole of the clamp with the first hole and the second hole of the base along the common axis; and
    a lateral hole transverse to the longitudinal hole of the clamp;
  a first fastener disposed in the lateral hole and selectively accessible through the longitudinal hole; and
  a locking pin removably adjoining the first hole, the second hole, and the longitudinal hole; and
    wherein the locking pin is configured to inhibit access to the first fastener disposed in the lateral hole of the clamp;
providing a third mount attached to the rooftop of the vehicle and the object;
providing a fourth mount attached to the rooftop of the vehicle and the object;
rotating at least one of the clamp of the first mount and the clamp of the second mount about the respective common axis to compensate for the non-planar profile of the rooftop of the vehicle or the object;
fastening the first fastener of the first mount disposed in the corresponding lateral hole upon accessing through the corresponding longitudinal hole;
disposing the locking pin of the first mount adjoining the corresponding first hole, the corresponding second hole, and the corresponding longitudinal hole;
fastening the first fastener of the second mount disposed in the corresponding lateral hole upon accessing through the corresponding longitudinal hole; and
disposing the locking pin of the second mount adjoining the corresponding first hole, the corresponding second hole, and the corresponding longitudinal hole.

22. The method of claim 21 wherein providing the first mount further comprises:
a bracket configured to be fastened to the clamp using the first fastener via the lateral hole;
  wherein the bracket is configured to pivot about the first fastener to attain multiple variable angular orientations relative to the clamp; and
wherein the bracket is configured to secure the object using one or more second fasteners.

23. The method of claim 21, wherein providing the first fastener of the first mount further comprises:
a threaded bolt comprising:
  a shank; and
  a head; and
a nut;
wherein fastening the first fastener of the first mount disposed in the corresponding lateral hole comprises rotating the nut relative to the threaded bolt.

24. The method of claim 23, wherein providing the lateral hole of the first mount further comprises:
a rear side defining a first diameter; and
a front side oppositely disposed from the rear side defining a second diameter that is smaller than the first diameter of the rear side;
  wherein the rear side of the lateral hole is configured to allow passage of the shank and the head of the threaded bolt; and
wherein the front side of the lateral hole is configured to allow passage of the shank of the threaded bolt and configured to inhibit passage of the head of the threaded bolt.

* * * * *